(12) United States Patent
Wilson et al.

(10) Patent No.: US 8,121,708 B1
(45) Date of Patent: Feb. 21, 2012

(54) CONTROL SYSTEM DESIGN METHOD

(75) Inventors: David G. Wilson, Tijeras, NM (US);
Rush D. Robinett, III, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 846 days.

(21) Appl. No.: 12/052,180

(22) Filed: Mar. 20, 2008

Related U.S. Application Data

(60) Provisional application No. 60/896,043, filed on Mar. 21, 2007.

(51) Int. Cl.
*G05B 13/02* (2006.01)
(52) U.S. Cl. .......................................... 700/45; 700/97
(58) Field of Classification Search .................... 700/45, 700/97
See application file for complete search history.

(56) References Cited

U.S. PATENT DOCUMENTS

| | | | | |
|---|---|---|---|---|
| 5,057,992 | A * | 10/1991 | Traiger | 700/52 |
| 5,329,442 | A * | 7/1994 | Moshfegh | 700/29 |
| 6,216,083 | B1 * | 4/2001 | Ulyanov et al. | 701/106 |
| 6,415,272 | B1 * | 7/2002 | Ulyanov | 706/2 |
| 6,900,456 | B2 * | 5/2005 | Blais et al. | 257/31 |
| 7,398,162 | B2 * | 7/2008 | Downs et al. | 702/27 |
| 7,440,807 | B2 * | 10/2008 | Kanaoka et al. | 700/45 |
| 2002/0016665 | A1 * | 2/2002 | Ulyanov et al. | 701/106 |
| 2003/0093392 | A1 * | 5/2003 | Ulyanov | 706/13 |
| 2003/0169041 | A1 * | 9/2003 | Coury et al. | 324/307 |
| 2004/0086117 | A1 * | 5/2004 | Petersen et al. | 380/44 |
| 2004/0173793 | A1 * | 9/2004 | Blais et al. | 257/31 |
| 2005/0250651 | A1 * | 11/2005 | Amin et al. | 505/846 |
| 2007/0087756 | A1 * | 4/2007 | Hoffberg | 455/450 |
| 2007/0206715 | A1 * | 9/2007 | Godes | 376/100 |

OTHER PUBLICATIONS

Anthony, K. H. et al., "HamiltonÂ?s Action Principle and Thermodynamics of Irreversible Processes—A Unifying Procedure for Reversible and Irreversible Processes", *J. Non-Newtonian Fluid Mechanics*, vol. 96,2001, pp. 291-339.

Hill, D. et al., "The Stability of Nonlinear Dissipative Systems", *IEEE Transactions on Automatic Control* Oct. 1976, pp. 708-710.

Kokotovic, P. et al., "Constructive Nonlinear Control: A Historical Perspective", *Preprint submitted to Elsevier*, Aug. 2000.

Kristic, M. et al., "Nonlinear and Adaptive Control Design", John Wiley & Sons, Inc., New York, 1985, Chapters 1 and 3.

Moylan, P. J. et al., "Implications of Passivity in a Class of Nonlinear Systems", *IEEE Transactions of Automatic Control*, vol. AC-19, No. 4, Aug. 1974, pp. 373-381.

Ortega, R. et al., "Passivity-Based Control of Nonlinear systems: A Tutorial", *Proceedings of the American Control Conference*, Albuquerque, NM, Jun. 1997, pp. 2633-2637.

Robinett, Rush D. et al., "Collective Plume Tracing: A Minimal Information Approach to Collective Control", *IEEE 2007 American Control Conference*, Jul. 2007.

(Continued)

*Primary Examiner* — Albert Decady
*Assistant Examiner* — Anthony Whittington
(74) *Attorney, Agent, or Firm* — Olivia J. Tsai

(57) ABSTRACT

A control system design method and concomitant control system comprising representing a physical apparatus to be controlled as a Hamiltonian system, determining elements of the Hamiltonian system representation which are power generators, power dissipators, and power storage devices, analyzing stability and performance of the Hamiltonian system based on the results of the determining step and determining necessary and sufficient conditions for stability of the Hamiltonian system, creating a stable control system based on the results of the analyzing step, and employing the resulting control system to control the physical apparatus.

17 Claims, 32 Drawing Sheets

OTHER PUBLICATIONS

Robinett, Rush D. et al., "Collective Systems: Physical and Information Exergies", *Sandia Report* SAND2007-2327, Apr. 2007.

Robinett, Rush D. et al., "Decentralized Exergy/Entropy Thermodynamic Control for Collective Robotic Systems", *ASME 2007 International Mechanical Engineering Congress & Exposition*, Nov. 11, 2007.

Robinett, Rush D. et al., "Exergy and Entropy Thermodynamic Concepts for Control System Design: Slewing Single Axix", *2006 AIAA Guidance, Nagivation, and Control Conference*, Aug. 21, 2006.

Robinett, Rush D. et al., "Exergy and Entropy Thermodynamic Concepts for Nonlinear Control Design", *2006 ASME International Mechanical Engineering Congress & Exposition*, Nov. 5, 2006.

Robinett, Rush D. et al., "Exergy and Irreversible Entropy Production Thermodynamic Concepts for Control Design: Nonlinear Regulator Systems", *The 8th IASTED International Conference on Control and Applications*, May 2006.

Robinett, Rush D. et al., "Exergy and Irreversible Entropy Production Thermodynamic Concepts for Control System Design: Nonlinear Systems", *Proceedings of the 2006 14th Mediterranean Conference on Control and Automation*, Jun. 2006, pp. 1-8.

Robinett, Rush D. et al., "Exergy and Irreversible Entropy Production Thermodynamic Concepts for Control System Design: Regulators", *Proceedings of the 2006 IEEE International Conference on Control Applications*, Oct. 2006, pp. 2249-2256.

Robinett, Rush D. et al., "Exergy and Irreversible Entropy Production Thermodynamic Concepts for Control System Design: Robotic Servo Applications", *Proceedings of the 2006 IEEE International Conference on Robotics and Automation*, May 2006, pp. 3685-3692.

Robinett, Rush D. et al., "Exergy Sustainability", *Sandia Report SAND2006-2759*, May 2006.

Robinett, Rush D. et al., "Exergy Sustainability for Complex Systems", *InterJournal Complex Systems*, 1616, New England Complex Systems Institute, Sep. 2006.

Soltine, J. E. et al., "Applied Nonlinear Control", *Prentice Hall, Inc., N.J.*, 1991, Chapter 1(partial), Part I, Chapter 2, Section 2.4-2.8, Chapter 3, Section 3.1-3.2, 3.4, 3.6-3.8, Chapter 4, Section 4.1, and Part II, II.1, II.2, II.3 (partial), II.4.

Willems, J. C. et al., "Dissipative Dynamical Systems Part I: General Theory; Part II: Linear Systems with Quadratic Supply Rates", *Archive for Rational Mechanics and Analysis*, vol. 45, 1972, pp. 321-393.

Wyatt, J. L. et al., "Energy Concepts in the State-Space Theory of Nonlinear n-Ports: Part 1—Passivity", *IEEE Transactions on Circuits and Systems*, vol. CAS-28, No. 1, Jan. 1981, pp. 48-61.

Wyatt, J. L. et al., "Energy Concepts in the State-Space Theory of Nonlinear n-Ports: Part II—Losslessness", *IEEE Transactions on Circuits and Systems*, vol. CAS-29, No. 7, Jul. 1982, pp. 417-430.

* cited by examiner

CONTROL SYSTEM DESIGN METHOD

CROSS-REFERENCE TO RELATED APPLICATIONS

This application claims priority to and the benefit of the filing of U.S. Provisional Patent Application Ser. No. 60/896, 043, entitled "Exergy and Irreversible Entropy Production Thermodynamic Concepts for Control System Design", filed on Mar. 21, 2007, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to control system design methods.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Today's engineering systems sustain desirable performance by using well-designed control systems based on fundamental principles and mathematics. Many engineering breakthroughs and improvements in sensing and computation have helped to advance the field. Control systems currently play critical roles in many areas, including manufacturing, electronics, communications, transportation, computers, and networks, as well as many commercial and military systems. Traditionally, almost all modern control design is based on forcing the nonlinear systems to perform and behave like linear systems, thus limiting its maximum potential. In this paper a novel nonlinear control design methodology is introduced that overcomes this limitation.

Several of the popular advanced nonlinear control system approaches are based in passivity and dissipative control theories. Initially, P. J. Moylan, *Implications of Passivity in a Class of Nonlinear Systems*, IEEE Transactions of Automatic Control, Vol. AC-19, No. 4, August 1974, pp. 373-381, discussed the implications of passivity for a broad class of nonlinear systems, wherein a connection is established between the input-output property of passivity and a set of constraints on the state equations for the system. Later, J. L. Wyatt, Jr., L. O. Chua, J. W. Gannett, I. C. Goknar, and D. N. Green, *Energy Concepts in the State-Space Theory of Nonlinear n-Ports: Part I—Passivity*, IEEE Transactions on Circuits and Systems, Vol. CAS-28, No. 1, January 1981, pp. 48-61; and J. L. Wyatt, Jr., L. O. Chua, J. W. Gannett, I. C. Goknar, and D. N. Green, *Energy Concepts in the State-Space Theory of Nonlinear n-Ports: Part II—Losslessness*, IEEE Transactions on Circuits and Systems, Vol. CAS-29, No. 7, July 1982, pp. 417-430, clarified the meaning of passivity and losslessness as understood in nonlinear circuit theory, and their counterparts in classical physics. Most recently, R. Ortega, Z. P. Jiang, and D. J. Hill, *Passivity-Based Control of Nonlinear systems: A Tutorial*, Proceedings of the American Control Conference, Albuquerque, N. Mex., June 1997, pp. 2633-237, reviewed recent results on the stabilization of nonlinear systems using a passivity approach. Passivity properties play a vital role in designing asymptotically stabilizing controllers for nonlinear systems where the nonlinear versions of the Kalman-Yacubovitch-Popov lemma are used as key testing tools. The dissipative characteristics of dynamical systems have their origins in work by J. C. Willems, *Dissipative Dynamical Systems Part I: General Theory; Part II: Linear Systems with Quadratic Supply Rates*, Archive for Rational Mechanics and Analysis, Vol. 45, pp. 321-393, 1972, with further specifics given by D. Hill and P. J. Moylan, *The Stability of Nonlinear Dissipative Systems*, IEEE Transactions on Automatic Control, October 1976, pp. 708-710, in which a technique is introduced for generating Lyapunov functions for a broad class of nonlinear systems represented by state equations. The system, for which a Lyapunov function is required, is assumed to have a property called dissipativeness. In other words, the system absorbs more energy from the external world than it supplies. Different types of dissipativeness can be considered depending on how the "power input" is selected. Dissipativeness is shown to be characterized by the existence of a computable function which can be interpreted as the "stored energy" of the system. Under certain conditions, this energy function is a Lyapunov function which establishes stability, and in some cases asymptotic stability, of the isolated system. It was shown that for a certain class of nonlinear systems, that an "energy" approach was useful in analyzing stability. P. Kokotovic and M. Arcak, *Constructive Nonlinear Control: A Historical Perspective*, Preprint submitted to Elsevier, August 2000, provide a recent discussion about the historical perspective of constructive nonlinear control theories. Structural properties of nonlinear systems and passivation-based designs exploit the connections between passivity and inverse optimality, and between Lyapunov functions and optimal value functions. Recursive design procedures, such as backstepping and forwarding, achieve certain optimal properties for important classes of nonlinear systems. Some of the more popular nonlinear control system designs, e.g., J.-J. E. Slotine and W. Li, *Applied Nonlinear Control*, Prentice Hall, Inc., N.J., 1991; M. Kristic, I. Kanellakopoulos, and P. Kokotovic, *Nonlinear and Adaptive Control Design*, John Wiley & Sons, Inc., New York, 1995; and P. A. Ioannou and J. Sun, *Robust Adaptive Control*, Prentice Hall, Englewood Cliffs, N.J., 1996, have their fundamental foundations built upon these concepts.

In other engineering disciplines, A. A. Alonso and B. E. Ydstie, *Stabilization of Distributed Systems Using Irreversible Thermodynamics*, Automatica, Vol. 37, 2001, pp. 1739-1755, connect thermodynamics and the passivity theory of nonlinear control. The storage function is derived from the convexity of the entropy and is closely related to thermodynamic availability. Dissipation is related to positive entropy production. In this form the supply function is a product of force and flow variation variables. Results are discussed in relationship to heat conduction and reaction diffusion equation problems. K.-H. Anthony, *Hamilton's Action Principle* and *Thermodynamics of Irreversible Processes—A Unifying Procedure for Reversible and Irreversible Processes*, J. Non-Newtonian Fluid Mechanics, Vol. 96, 2001, pp. 291-339, suggests that non-equilibrium thermodynamics of irreversible processes may be included into the framework of a Lagrangian formalism. This formalism presents a unified method for reversible and irreversible processes. A straightforward procedure allows for the incorporation of both the first and second laws of thermodynamics into the Lagrangian. The theory is illustrated in three representative examples which include; material flow, heat conduction, diffusion and chemical reactions.

The main contribution of this paper is to present a novel nonlinear control design methodology that is based on thermodynamic exergy and irreversible entropy production concepts. Relationships are developed between exergy, irreversible entropy production, Hamiltonian systems, Lyapunov optimal functions, electric AC power concepts, and power flow, for control system design. Both necessary and sufficient conditions for stability are determined for nonlinear systems. By combining the first and second laws of thermodynamics, an exergy analysis approach is developed to construct Lyapunov optimal functions for Hamiltonian systems. The first time derivative of the Lyapunov functions, based on exergy, irreversible entropy production rate, and power flow is partitioned into either exergy dissipative or exergy generative terms.

Embodiments of the present invention are also described in Robinett, et al., "Exergy and Irreversible Entropy Production Thermodynamic Concepts for Control System Design: Robotic Servo Applications", Proceedings of the 2006 IEEE International Conference on Robotics and Automation, pp. 3685-3692, May 2006; Robinett, et al., "Exergy and Irreversible Entropy Production Thermodynamic Concepts for Control System Design: Regulators", Proceedings of the 2006 IEEE International Conference on Control Applications, pp. 2249-2256, October 2006; and Robinett, et al., "Exergy and Irreversible Entropy Production Thermodynamic Concepts for Control System Design: Nonlinear Systems", Proceedings of the 2006 14$^{th}$ Mediterranean Conference on Control and Automation, pp. 1-8 (June 2006); Robinett III, R. D., Wilson, D. G. and Reed, A. W., "Exergy Sustainability for Complex Systems", InterJournal Complex Systems, 1616, New England Complex Systems Institute, September 2006; Robinett III, R. D. and Wilson, D. G., "Decentralized Exergy/Entropy Thermodynamic Control for Collective Robotic Systems", ASME 2007 International Mechanical Engineering Congress & Exposition, Seattle, Wash., Nov. 11-15, 2007; Robinett, III, R. D. and Wilson, D. G., "Collective Plume Tracing: A Minimal Information Approach to Collective Control," IEEE 2007 American Control Conference, New York, N.Y., July 2007; Robinett III, R. D. and Wilson, D. G., "Exergy and Entropy Thermodynamic Concepts for Nonlinear Control Design", 2006 ASME International Mechanical Engineering Congress & Exposition, Chicago, Ill., Nov. 5-10, 2006; Robinett III, R. D. and Wilson, D. G., "Exergy and Entropy Thermodynamic Concepts for Control System Design: Slewing Single Axis", 2006 AIAA Guidance, Navigation, and Control Conference, Keystone, Colo., Aug. 21-24, 2006; Robinett III, R. D. and Wilson, D. G., "Exergy and Irreversible Entropy Production Thermodynamic Concepts for Control Design: Nonlinear Systems", 14th Mediterranean Conference on Control and Automation, Ancona, Italy, Jun. 28-30, 2006; Robinett III, R. D. and Wilson, D. G., "Exergy and Irreversible Entropy Production Thermodynamic Concepts for Control Design: Nonlinear Regulator Systems", The 8th IASTED International Conference on Control and Applications, Montreal, Quebec, Canada, May 24-26, 2006; Robinett III, R. D., Wilson, D. G., and Reed, A. W., "Exergy Sustainability", Sandia Report SAND2006-2759, May 2006; and Robinett III, R. D. and Wilson, D. G., "Collective Systems: Physical and Information Exergies", Sandia Report SAND2007-2327, April 2007, all of which are incorporated herein by reference.

BRIEF SUMMARY OF THE INVENTION

The present invention is of a control system design method and concomitant control system comprising: representing a physical apparatus to be controlled as a Hamiltonian system; determining elements of the Hamiltonian system representation which are power generators, power dissipators, and power storage devices; analyzing stability and performance of the Hamiltonian system based on the results of the determining step and determining necessary and sufficient conditions for stability of the Hamiltonian system; creating a stable control system based on the results of the analyzing step; and employing the resulting control system to control the physical apparatus. In the preferred embodiment, the control system is nonlinear. Stability is determined in terms of power flow, preferably in terms of whether the Hamiltonian system is moving toward or away from its minimum energy and maximum entropy state. Stability is determined via a Lyapunov derivative function, preferably one that is a decomposition and sum of exergy dissapation rate and exergy generation rate. The Hamiltonian system can be, for example, a forced harmonic oscillator, a mass-spring-damper dynamic system, or a Duffing oscillator/Coulomb friction nonlinear damper system. The physical apparatus can be any of the following: manufacturing devices, electronic devices, communications devices, transportation apparatuses, computer devices, computer networks, military apparatus, electrical power grids, Supervisory Control And Data Acquisition apparatus, and pipeline apparatus.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
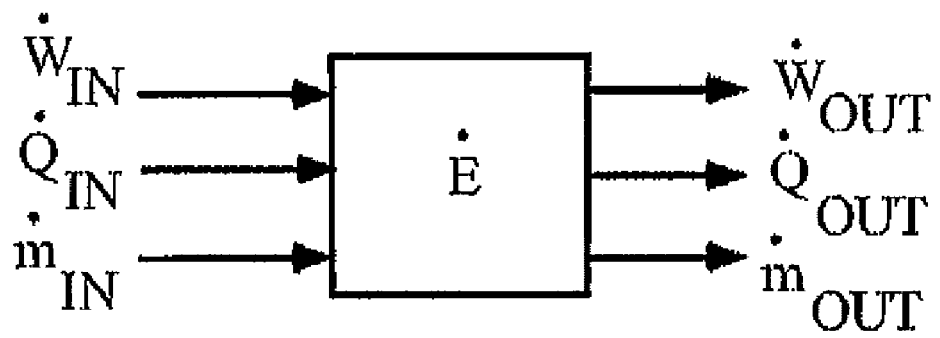
FIG. 1 illustrates the first law of thermodynamics for a volume control.

The present invention is of a method of designing control systems for physical apparatuses. For purposes of the specification and claims, physical apparatuses include devices used in the fields of robotics, automation, manufacturing, electronics, communications, transportation, computers, and computer networks.

The present invention is of a novel control system design methodology. The methodology provides a unique set of criteria to design nonlinear controllers for nonlinear systems with respect to both performance and stability. It works by combining: concepts from thermodynamic exergy and entropy; Hamiltonian systems; Lyapunov's direct method and Lyapunov optimal analysis; electric AC power concepts; and power flow analysis. The thermodynamic concepts are employed to allow the control design to be viewed as a power flow approach that is subject to the balance of power generation and power dissipation for the Hamiltonian system. This approach provides both necessary and sufficient conditions for stability while simultaneously allowing for performance specifications. Traditionally almost all modern control design is based on forcing the nonlinear systems to perform and behave like linear systems, thus limiting its maximum potential. In this invention a novel nonlinear control design methodology is introduced that overcomes this limitation.

The present invention can revolutionize the way that control systems are designed. The field of control plays a critical role in many areas, such as: manufacturing, electronics, communications, transportation, computers, and networks, as well as many commercial and military systems. This methodology is directly applicable to the design and control of complex, multi-component and often adaptive systems of arbitrary purpose, design and underlying physics, such as critical infrastructure (electric power grids, Supervisory Control And Data Acquisition (SCADA) systems, telecommunication and satellite systems, oil and gas pipelines) and military systems (network centric warfare, critical assets/nuclear security systems). The secure and reliable operation for all these systems is vital to a healthy economy for both civil and military infrastructure. In addition, the methodology is inclusive of exergy sustainability for most open systems which may include mass, energy, entropy, and exergy flow analysis. For example, this approach can be used to design efficient satellite spacecraft systems, distributed/decentralized energy system utilization, and vehicle survivability subject to maximizing finite power limitations during the course of the mission. This is a novel approach to the design of these types of systems.

The methodology is described and then is demonstrated with several fundamental numerical simulation examples: (1) a forced harmonic oscillator; (2) a mass-spring-damper dynamic system that employs PD/PID (proportional-derivative/proportional-integral-derivative) regulator control; (3) a Duffing oscillator/Coulomb friction nonlinear model that employs PID regulator control; and (4) a linear PID tracking control design for the mass-spring-damper system. The control system performances are partitioned and evaluated based on exergy generation and exergy dissipation terms. This novel nonlinear control methodology results in both necessary and sufficient conditions for stability of nonlinear systems.

In this section the first and second laws of thermodynamics are introduced. The first law of thermodynamics states energy is conserved (see FIG. 1). The second law of thermodynamics states that the entropy of the universe always increases. The first law is a conservation equation while the second law is an inequality. Mathematically, the first law can be written in terms of its time derivatives or energy rate for a system as $$\dot{E} = \sum_i \dot{Q}_i + \sum_j \dot{W}_j + \sum_k \dot{m}_k (h_k + ke_k + pe_k + \ldots). \tag{1}$$

The term on the left represents the rate at which energy is changing within the system. The heat entering or leaving the system is given by $\dot{Q}_i$, the work entering or leaving the system is given by $\dot{W}_j$. Next, material can enter or leave the system by $\dot{m}_k$ that includes enthalpy, h, kinetic and potential energies, ke, pe, etc. In addition, each term is "summed" over an arbitrary number of entry and exit locations i, j, k.

Figure 2:
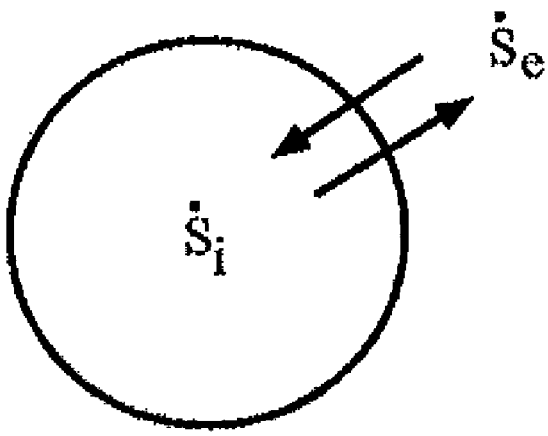
FIG. 2 illustrates entropy within a flux exchange system.

The second law or entropy rate equation for a system is given as $$\dot{S} = \sum_i \frac{\dot{Q}_i}{T_i} + \sum_k \dot{m}_k s_k + \dot{S}_i = \dot{S}_e + \dot{S}_i. \quad (2)$$

where the left hand term is the rate entropy changes within the system and the right hand terms represent, in order, the rate heat conducts entropy to and from the system and the rate material carries it in or out. These two terms can be combined into one term $\dot{S}_e$, the entropy exchanged (either positive or negative) with the environment and $\dot{S}_i$ is the irreversible entropy production rate within the system. FIG. 2 shows the entropy exchanges and production within the system.

The irreversible entropy production rate can be written as the sum of the thermodynamic forces and the thermodynamic flows $$\dot{S} = \sum_k F_k \dot{X}_k \geq 0 \quad (3)$$

where the entropy change is the sum of all the changes due to the irreversible flows $\dot{X}_k$ with respect to each corresponding thermodynamic force $F_k$.

Next, for systems maintained at constant temperature and volume, a thermodynamic quantity called the Helmholtz free energy function is defined as $$\Xi = E - T_o S \quad (4)$$

where $T_o$ is the reference environmental temperature. The Helmholtz free energy function is described as the maximum theoretically available energy that can do work which we call exergy. Exergy is also known as negative-entropy. By taking the time derivative of the Helmholtz free energy function (4) and substituting in the expressions for the first (1) and second (2) (multiplied by the environmental temperature) laws, results in the exergy rate equation $$\dot{\Xi} = \sum_i \left(1 - \frac{T_o}{T_i}\right) \dot{Q}_i + \sum_j \left(\dot{W}_j - p_o \frac{d\overline{V}}{dt}\right) + \sum_k \dot{m}_k \zeta_k^{flow} - T_o \dot{S}_i. \quad (5)$$

where $\dot{\Xi}$ is the rate at which exergy stored within the system is changing. The terms on the right, in order, define the rate exergy is carried in/out by; i) heat, ii) work (less any work the system does on the environment at constant environmental pressure $p_o$ if the system volume $\nabla$ changes), and iii) by the material (or quantity known as flow exergy). The final term, $T_o \dot{S}_i$, is the rate exergy is destroyed within the system.

Next, Hamiltonian Mechanics are discussed. The derivation of the Hamiltonian begins with the Lagrangian for a system defined as $$L = T(q, \dot{q}, t) - V(q, t) \quad (6)$$

where
t=time explicitly
q=N-dimensional generalized coordinate vector
$\dot{q}$=N-dimensional generalized velocity vector
T=Kinetic energy
V=Potential energy The Hamiltonian is defined in terms of the Lagrangian as $$H \equiv \sum_{i=1}^{n} \frac{\partial L}{\partial \dot{q}} \dot{q} - L(q, \dot{q}, t) = H(q, \dot{q}, t). \quad (7)$$

The Hamiltonian in terms of the canonical coordinates (q, p) is $$H(q, p, t) = \sum_{i=1}^{n} p_i \dot{q}_i - L(q, \dot{q}, t) \quad (8)$$

where the canonical momentum is defined as $$p_i = \frac{\partial L}{\partial \dot{q}}. \quad (9)$$

Then Hamilton's canonical equations of motion become $$\dot{q}_i = \frac{\partial H}{\partial p_i} \quad (10)$$

$$\dot{p}_i = -\frac{\partial H}{\partial q_i} + Q_i$$

where $Q_i$ is the generalized force vector. Next taking the time derivative of (8) gives $$\dot{H} = \sum_{i=1}^{n} \left(\dot{p}_i \dot{q}_i + p_i \ddot{q}_i - \frac{\partial L}{\partial t} - \frac{\partial L}{\partial q_i} \dot{q}_i - \frac{\partial L}{\partial \dot{q}_i} \ddot{q}_i\right). \quad (11)$$

Then substituting (10) and simplifying gives $$\dot{H} = \sum_{i=1}^{n} Q_i \dot{q}_i - \frac{\partial L}{\partial t}. \quad (12)$$

Hamiltonians for most natural systems are not explicit functions of time (or $\partial L/\partial t = 0$). Then for $$L = L(q, \dot{q}) \quad (13)$$

the power (work/energy) equation becomes $$\dot{H}(q, p) = \sum_{i=1}^{n} Q_i \dot{q}_i. \quad (14)$$

Thermo-Mechanical Relationships are next discussed. A system is conservative if $\dot{H} = 0$ and $H$=constant.

A force is conservative if $$\oint F \cdot dx = \oint F \cdot v \, dt = \oint Q_j \dot{q}_j \, dt = 0$$

where F is the force, dx the displacement, and v the velocity. Basically, all of the forces can be modeled as potential force fields which are storage devices.

A thermodynamic system is reversible if $$dS = \frac{dQ}{T}$$

$$\oint dS = \oint \frac{dQ}{T} = 0$$

$$\oint dS = \oint [dS_i + dS_e] = \oint [\dot{S}_i + \dot{S}_e] dt = 0$$

which implies that $\dot{S}_e = \dot{Q}/T$ since by definition the second law gives $\dot{S}_i = 0$.

A thermodynamic system is irreversible if for $$\oint dS = \oint [\dot{S}_i + \dot{S}_e] dt = 0$$

then $\dot{S}_e \leq 0$ and $\dot{S}_i \geq 0$.

Now the connections between thermodynamics and Hamiltonian mechanics are investigated.

1. The irreversible entropy production rate can be expressed as $$\dot{S}_i = \sum_k F_k \dot{X}_k = \frac{1}{T_o} \sum_k Q_k \dot{q}_k \geq 0. \quad (15)$$

2. The time derivative of the Hamiltonian is equivalent to the exergy rate $$\dot{H} = \sum_k Q_k \dot{q}_k \quad (16)$$

$$\Xi = \dot{W} - T_o \dot{S}_i = \sum_{j=1}^{N} Q_j \dot{q}_j - \sum_{l=N}^{M-N} Q_l \dot{q}_l.$$

Where the following assumptions apply when utilizing the exergy rate equation (5) for Hamiltonian systems:

(a) No substantial heat flow:

$$\dot{Q}_r \approx 0.$$

(b) No substantial exergy flow or assume $T_i$ is only slightly greater than $T_o$:

$$1 - \frac{T_o}{T_i} \approx 0.$$

(c) No $p_o \nabla$ work on the environment:

$$p_o \frac{d\overline{V}}{dt} = 0.$$

(d) No mass flow rate:

$$\sum_k \dot{m}_k \zeta_k^{flow} = 0.$$

(e) Then define:

$$\dot{W} \geq 0 \text{ powerinput/generated}$$

$$T_o \dot{S}_i \geq 0 \text{ powerdissipated}.$$

3. A conservative system is equivalent to a reversible system when $$\dot{H} = 0 \text{ and } \dot{S}_e = 0$$

then $$\dot{S}_i = 0 \text{ and } \dot{W} = 0.$$

Figure 3:
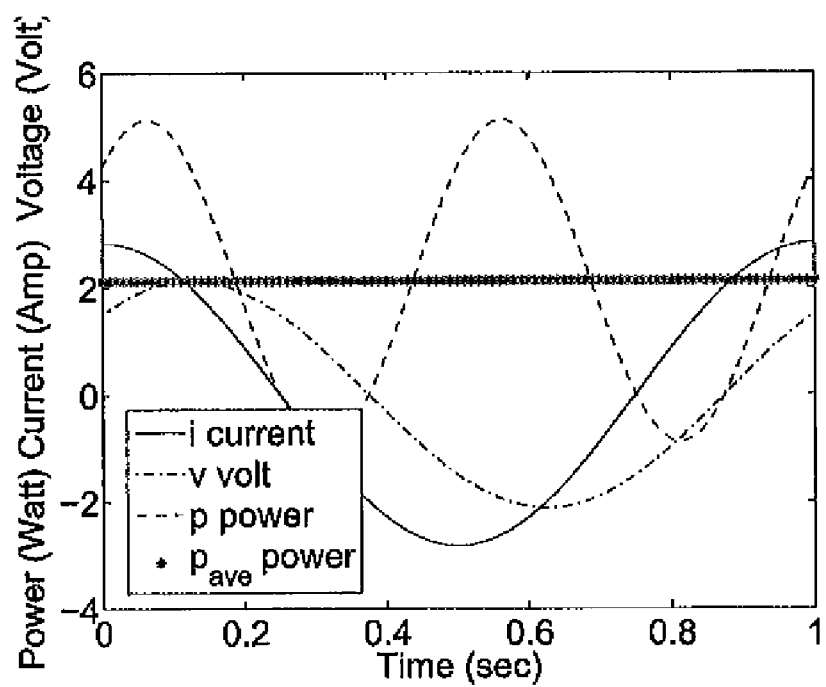
FIG. 3 shows time response for power in a general AC circuit with $\omega=2\pi$, $\bar{v}=1.5$, $\bar{i}=2.0$, and $\theta=\pi/4$.

4. For a system that "appears to be conservative", but is not reversible is defined as:

$$\dot{H}_{ave} = 0 \qquad = \frac{1}{\tau} \oint [\dot{W} - T_o \dot{S}_i] dt$$

$$= (\dot{W})_{ave} - (T_o \dot{S}_i)_{ave} \qquad = \frac{1}{\tau} \oint \left[ \sum_{j}^{N} Q_j \dot{q}_j - \sum_{l=N}^{M-N} Q_l \dot{q}_l \right] dt$$

$$= averagepoweroveracycle$$

where $\tau$ is the period of the cycle. To be more specific about the average power calculations, the AC power factor provides an excellent example. For the general case of alternating current supplied to a complex impedance the voltage and current differ in phase by an angle $\theta$. The time responses for power, voltage, and current are shown for a general AC circuit in FIG. 3. For $$\dot{W} = P = Q\dot{q} = vi = \sqrt{2}\,\overline{v}\cos(\omega t + \theta) \cdot \sqrt{2}\,\overline{i}\cos\omega t$$

$$= \overline{v}\overline{i}[\cos\theta + \cos(2\omega t + \theta)]$$

where P is power, v is voltage ($\overline{v}$), i is current ($\overline{i}$), $\theta$ is the phase angle, and $\omega$ is the frequency. Integrating over a cycle gives $$(\dot{W})_{ave} = \overline{v}\overline{i} \cos\theta$$

where for the second term $$\oint \cos(2\omega t + \theta) dt = 0.$$

This is an important set of conditions that will be used in the next section to find the generalized stability boundary.

5. Finally, the power terms are sorted into three categories:
(a) $(\dot{W})_{ave}$–power generators; $(Q_j \dot{q}_j)_{ave} > 0$
(b) $(T_o \dot{S}_i)_{ave}$–power dissipators; $(Q_l \dot{q}_l)_{ave} < 0$
(c) $(Q_k \dot{q}_k)_{ave} = 0$; reversible/conservative exergy storage terms.

These three categories are fundamental terms in the following design procedures.

Next discussed are the necessary and sufficient conditions for stability. The Lyapunov function is defined as the total energy which for most mechanical systems is equivalent to an appropriate Hamiltonian function $$V = H \quad (17)$$

which is positive definite. The time derivative is $$\dot{V} = \dot{H} = \sum_k Q_k \dot{q}_k = \sum_{j}^{N} Q_j \dot{q}_j - \sum_{l=N}^{M-N} Q_l \dot{q}_l \quad (18)$$

$$= \dot{W} - T_o \dot{S}_i.$$

To describe a nonlinear system's behavior, two theorems help to characterize the essential features of its motion. In addition, by bounding the Lyapunov function between these Theorems, both necessary and sufficient conditions are a result of the transition of the time derivative of the Lyapunov function from stable to unstable.
  1. Lyapunov Theorem for Stability. Assume that there exists a scalar function V of the state x, with continuous first order derivatives such that $V(x)$ is positive definite $\dot{V}(x)$ is negative definite $V(x) \to \infty$ as $\|x\| \to \infty$ Then the equilibrium at the origin is globally asymptotically stable.
  2. Chetaev Theorem for Instability. Considering the equations of disturbed motion, let V be zero on the boundary of a region R which has the origin as a boundary point, and let both V and $\dot{V}$ be positive-definite in R; then the undisturbed motion is unstable at the origin.

Based on the relationship between thermodynamic exergy and Hamiltonian systems a fundamental stability Lemma can be formulated: The stability of Hamiltonian systems is bounded between Theorems 1 and 2. Given the Lyapunov derivative as a decomposition and sum of exergy dissipation rate and exergy generation rate then:

$$\dot{V} = \dot{W} - T_o \dot{S}_i = \sum_{j=1}^{N} Q_j \dot{q}_j - \sum_{l=N}^{M-N} Q_l \dot{q}_l \qquad (19)$$

that is subject to the following general necessary and sufficient conditions:

$T_o \dot{S}_i \geqq 0$ Positive semi-definite, always true $\dot{W} \geqq 0$ Positive semi-definite; exergy pumped into the system.

The following corollaries encompass both stability and instability for Hamiltonian systems which utilize AC power concepts:
  Corollary 1: For $(T_o \dot{S}_i)_{ave}=0$ and $(\dot{W})_{ave}=0$ then $\dot{V}=0$ the Hamiltonian system is neutrally stable, conservative and reversible.
  Corollary 2: For $(T_o \dot{S}_i)_{ave}=0$ and $(\dot{W})_{ave}>0$ then $\dot{V}>0$ the Hamiltonian system is unstable.
  Corollary 3: For $(T_o \dot{S}_i)_{ave}>0$ and $(\dot{W})_{ave}=0$ then $\dot{V}<0$ the Hamiltonian system is asymptotically stable and a passive system in the general sense (passivity controllers).
  Corollary 4: Given apriori $(T_o \dot{S}_i)_{ave}>0$ and $(\dot{W})_{ave}>0$ then the Hamiltonian system is further subdivided into:
    4.1: For $(T_o \dot{S}_i)_{ave}>(\dot{W})_{ave}$ with $\dot{V}<0$ yields asymptotic stability
    4.2: For $(T_o \dot{S}_i)_{ave}=(\dot{W})_{ave}$ with $\dot{V}=0$ yields neutral stability
    4.3: For $(T_o \dot{S}_i)_{ave}<(\dot{W})_{ave}$ with $\dot{V}>0$ yields an unstable system.
The bottom line is that stability is defined in terms of power flow which determines whether the system is moving toward or away from its minimum energy and maximum entropy state.

Present day applications use feedback controller designs that are Lyapunov Optimal. A control law is Lyapunov Optimal if it minimizes the first time derivative of the Lyapunov function over a space of admissible controls. In general, a set of feedback gains are optimized by minimizing the regulating and/or tracking error of the feedback controller while regulating to zero and/or tracking a desired reference input. The Lyapunov function is the total error energy which for most mechanical systems is equivalent to an appropriate Hamiltonian function $$V = H. \qquad (20)$$

Then the concept of Lyapunov Optimal follows directly from setting $\dot{W}=0$ in (19) and maximizing $T_o \dot{S}_i$ for which the time derivative of the Lyapunov function (Hamiltonian) or the modified power (work/energy) equation is written as $$\dot{V} = \dot{H} = -T_o \dot{S}_i = -\sum_{j=1}^{N} Q_j \dot{q}_j = -\sum_{j=1}^{N} F_j \dot{R}_j \qquad (21)$$

which is independent of system dynamics and is a kinematic quantity that applies to any system. Note that $F_j$ denotes a set of forces acting on a mechanical system and $\dot{R}_j$ denotes the inertial linear velocity of the point where $F_j$ is applied.

Passivity control follows directly from setting $\dot{W}=0$ in (19).

To summarize, the present invention provides a novel control system design methodology that uniquely combines: concepts from thermodynamic exergy and entropy; Hamiltonian systems; Lyapunov's direct method and Lyapunov optimal analysis; electric AC power concepts; and power flow analysis. Relationships are derived between exergy/entropy and Lyapunov optimal functions for Hamiltonian systems. This methodology is demonstrated below with several fundamental numerical simulation examples: 1) a forced harmonic oscillator; 2) a mass-spring-damper dynamic system that employs PD/PID regulator control; 3) a Duffing oscillator/Coulomb friction nonlinear model that employs PID regulator control; and 4) a linear PID tracking control design for the mass-spring-damper system. The control system performance results were partitioned and evaluated based on exergy generation and exergy dissipation terms. These results showed the stability boundaries for each numerical example which included both linear and nonlinear systems. This novel nonlinear control methodology resulted in both necessary and sufficient conditions for stability of nonlinear systems. In the near future, this novel control system design methodology will be extended to tracking and adaptive control of nonlinear systems. Although the methodology was demonstrated on simple linear and nonlinear dynamic systems, the methodology is applicable to a large class of nonlinear systems.

INDUSTRIAL APPLICABILITY

The invention is further illustrated by the following non-limiting examples. Several simple dynamic systems are investigated to demonstrate the exergy/entropy control design method of the invention.

EXAMPLE 1

Figure 4:
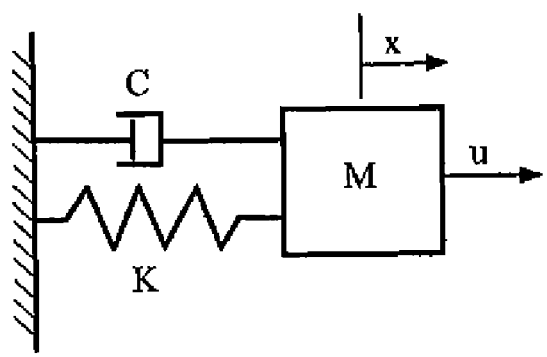
FIG. 4 illustrates a mass-spring-damper system.

The dynamic equation of motion for a forced harmonic oscillator (see FIG. 4) is defined as $$M\ddot{x} + C\dot{x} + Kx = F_o \cos \Omega t. \qquad (22)$$

The steady-state response has the form $$x_p = X \cos(\Omega t - \phi) \qquad (23)$$

Substitute (23) into (22) and solve for X which produces $$X = \frac{F_o/K}{\sqrt{\left[1-\left(\frac{\Omega}{\omega_n}\right)^2\right]^2 + \left[2\zeta\left(\frac{\Omega}{\omega_n}\right)\right]^2}} \text{ where } \omega_n^2 = \frac{K}{M},$$

$$\zeta = C/2M\omega_n \text{ and } \tan\varphi = 2\zeta\left(\frac{\Omega}{\omega_n}\right)\frac{1}{\left[1-\left(\frac{\Omega}{\omega_n}\right)^2\right]}.$$

Also note that for a static deflection $X_o = F_o/K$, where the dynamic magnification factor becomes $$H(\Omega) = \frac{X}{X_o} = \frac{1}{1-r^2} \text{ where } r = \frac{\Omega}{\omega_n} \text{ for } \zeta = 0.$$

For r=1 or $\Omega = \omega_n$, the response is undefined or unstable. This is shown conventionally with the Bode plot (see FIG. 12).

The forced harmonic oscillator dynamic model instability can also be predicted with exergy/entropy control. Applying the exergy/entropy control design (for power input or exergy generation rate only) gives $$\dot{V} = \dot{W} - T_o\dot{S}_i = \sum_{j=1}^{N} Q_j\dot{q}_j - \sum_{l=N}^{M-N} Q_l\dot{q}_l$$

$$= \dot{W} \qquad = Q\dot{q}.$$

Then by applying the following definitions for Q and $\dot{q}$ at $\Omega = \omega_n$, $\phi = \pi/2$, and $\zeta = 0$ gives $Q = F_o \cos \Omega t$ $\dot{q} = -X\Omega \sin(\Omega t - \pi/2)$ and with the appropriate variable substitutions yields $$Q\dot{q} = -F_o X \Omega \cos\Omega t \sin(\Omega t - \pi/2)$$

$$= \frac{1}{2}F_o X \Omega[\sin(\pi/2) - \sin(2\Omega t - \pi/2)] \text{ where}$$

$$(\dot{W})_{ave} = (Q\dot{q})_{ave} = \frac{1}{2}F_o X \Omega > 0.$$

The system is frequency and phase-locked which shows unbounded exergy generation and the response becomes infinite and unstable. This is also predicted in the following numerical simulations (see Case 2) with exergy/entropy control where the response grows unbounded.

Figure 5:
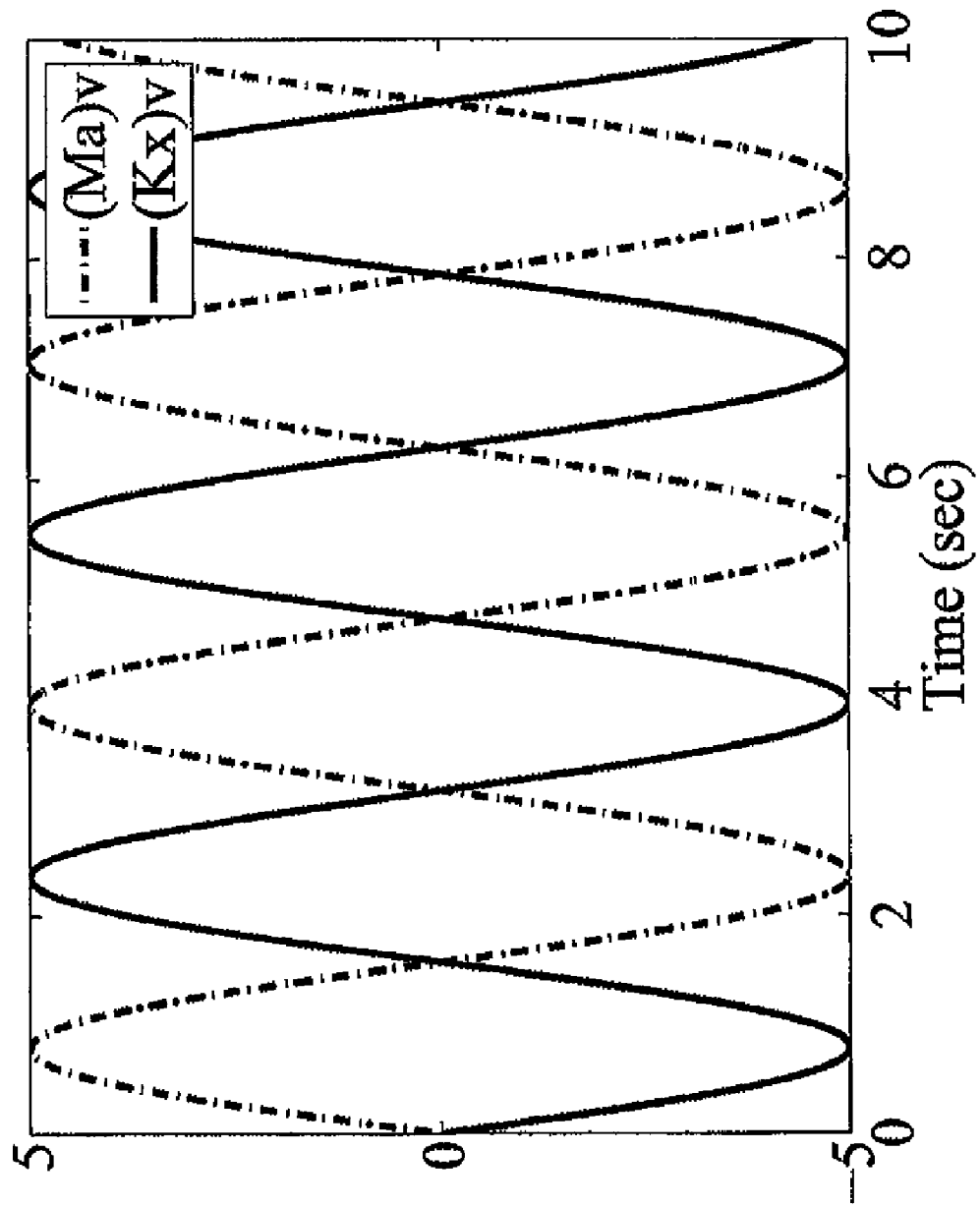
FIG. 5 illustrates a neutrally stable reversible, conservative system.

Given the SDOF harmonic oscillator with zero inputs as $M\ddot{x} + Kx = 0$ that is subject to the initial condition $x(0) = x_o = 1.0$ then one can apply the entropy control design as $$\dot{V} = \dot{W} - T_o\dot{S}_i$$

$$= \sum_{j=1}^{N} Q_j\dot{q}_j - \sum_{l=N}^{M-N} Q_l\dot{q}_l$$

which yields $(T_o\dot{S}_i)_{ave} = 0$ $(\dot{W})_{ave} = 0$ $(T_o\dot{S}_{rev})_{ave} = ([M\ddot{x}\cdot\dot{x} + Kx\cdot\dot{x}])_{ave} = 0.$ This demonstrates Corollary 1 for a neutrally stable, reversible, conservative Hamiltonian system. Note that the forces in the system are conservative, such that the potential and kinetic energy rates or average powers are zero over each cycle (see FIG. 5).

Figure 6A:
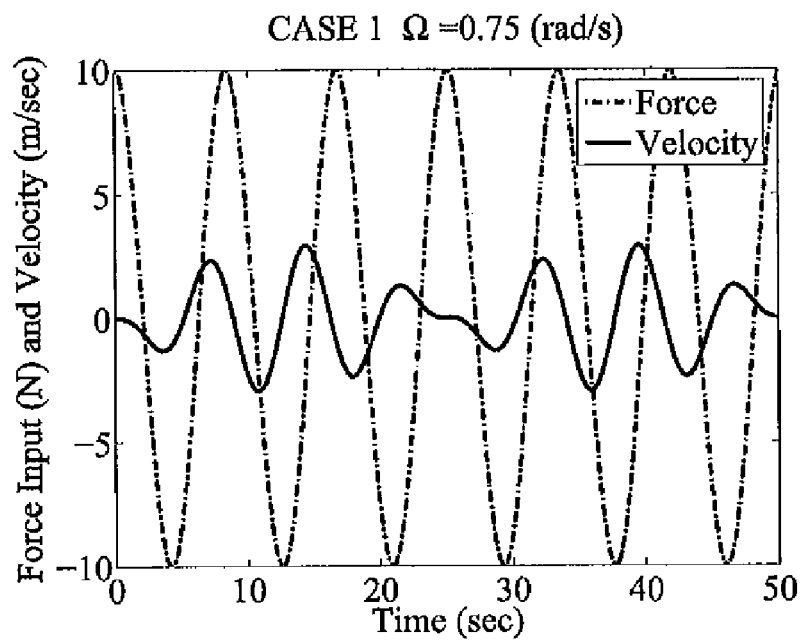
FIGS. 6(*a*) and (*b*) show for case 1 entropy control harmonic oscillator results.
Figure 6B:
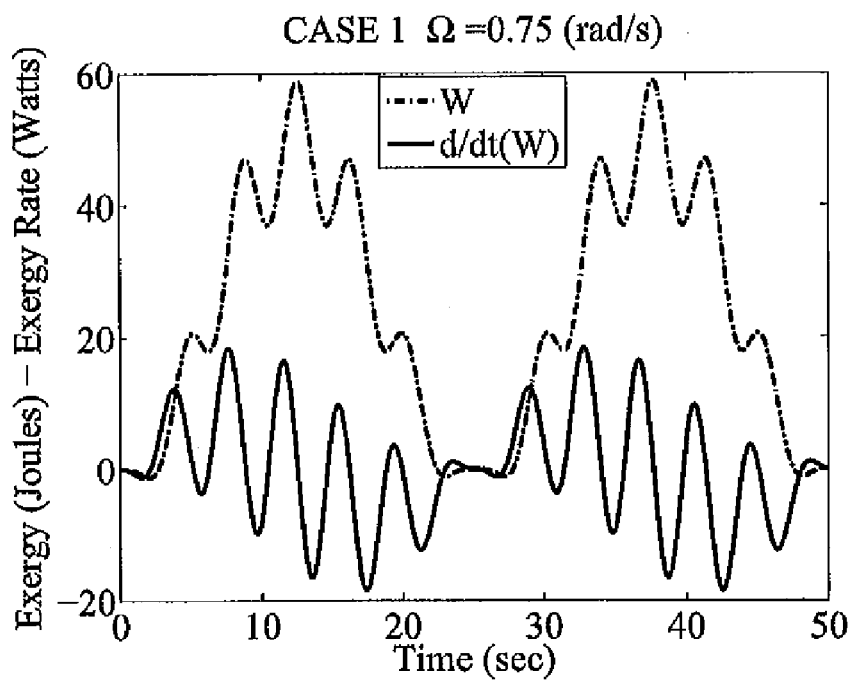
Figure 7A:
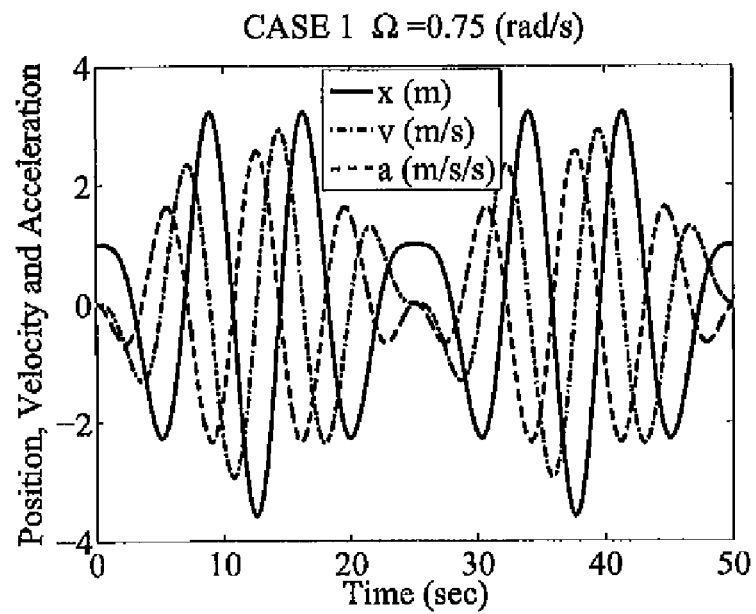
FIGS. 7(a) and (b) show for case 1a entropy control harmonic oscillator results.
Figure 7B:
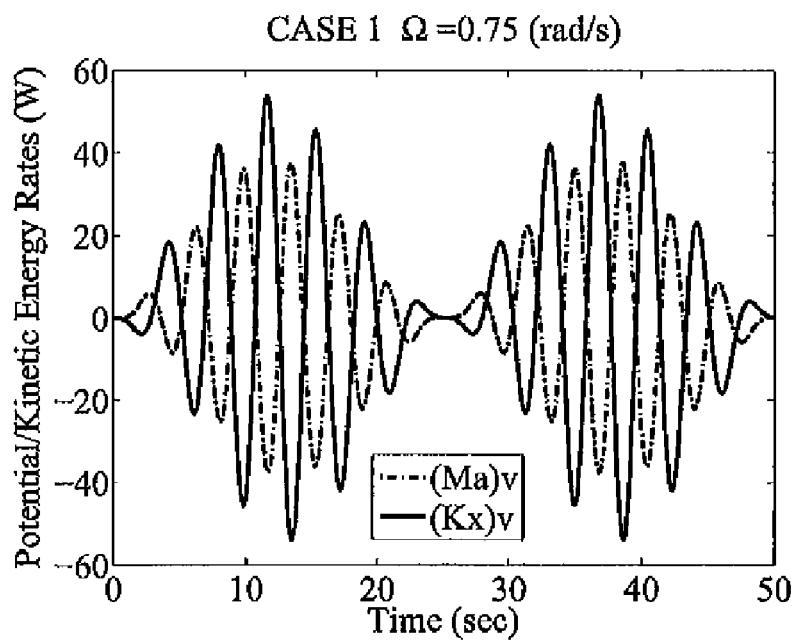
Figure 8A:
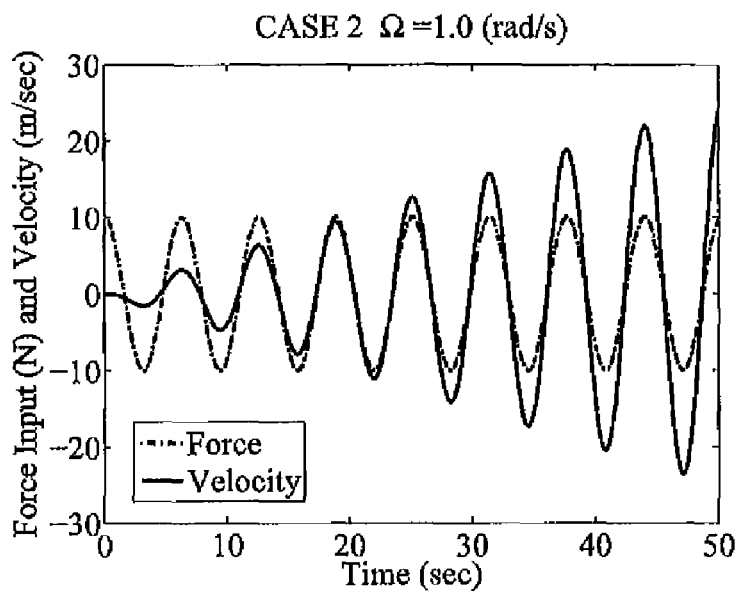
FIGS. 8(a) and (b) show for case 2 entropy control harmonic oscillator results.
Figure 8B:
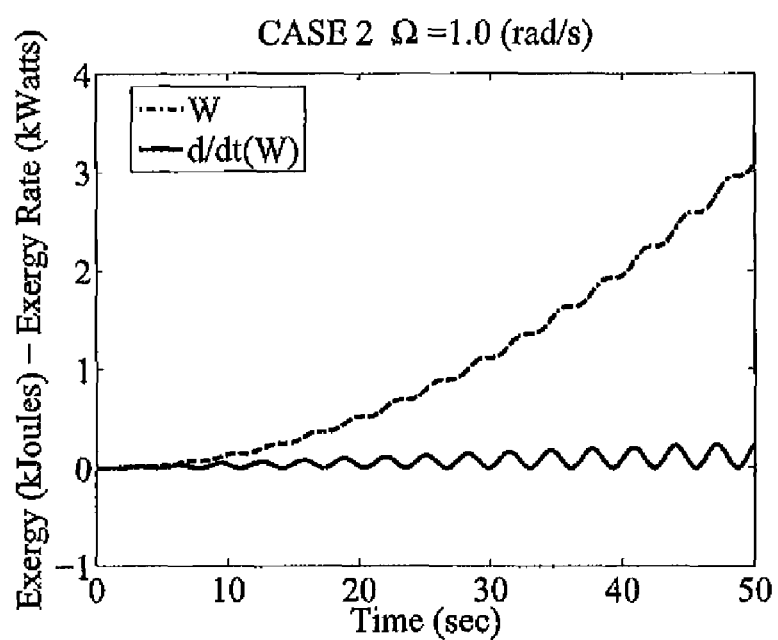
Figure 9A:
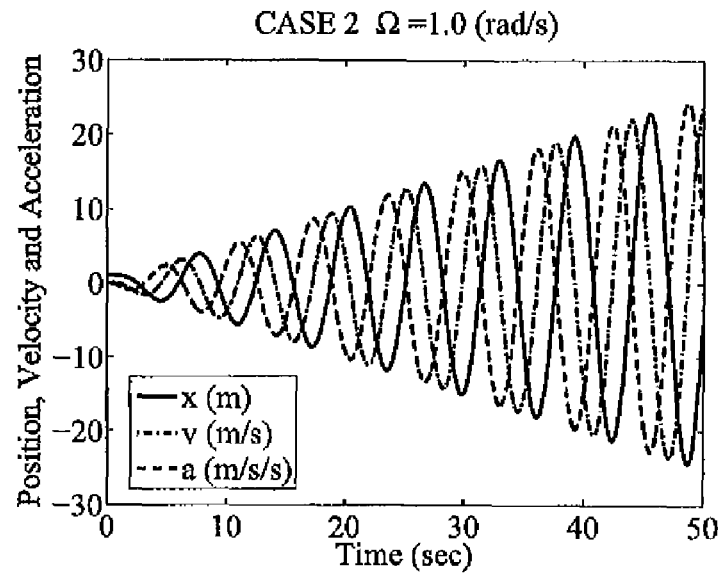
FIGS. 9(a) and (b) show for case 2a entropy control harmonic oscillator results.
Figure 9B:
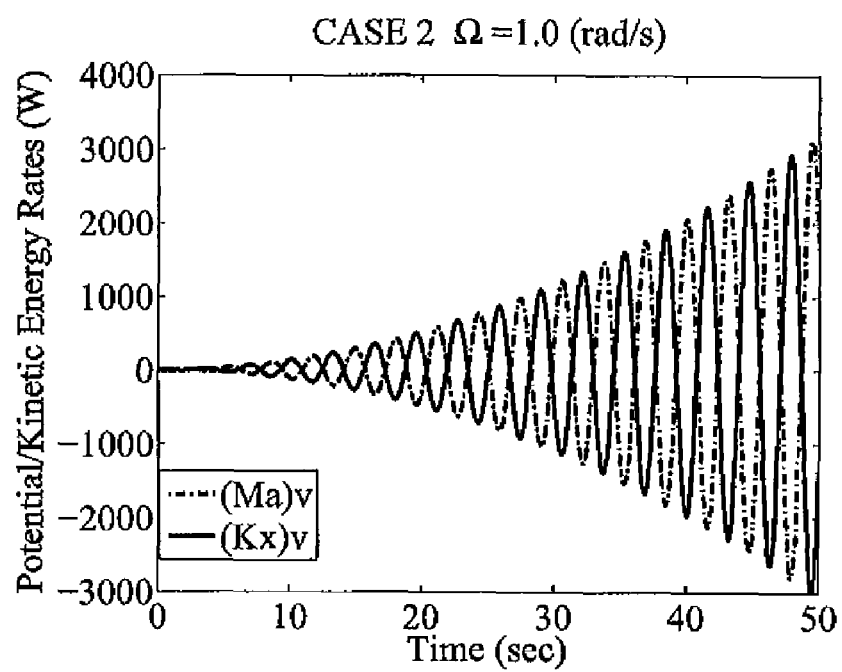
Figure 10A:
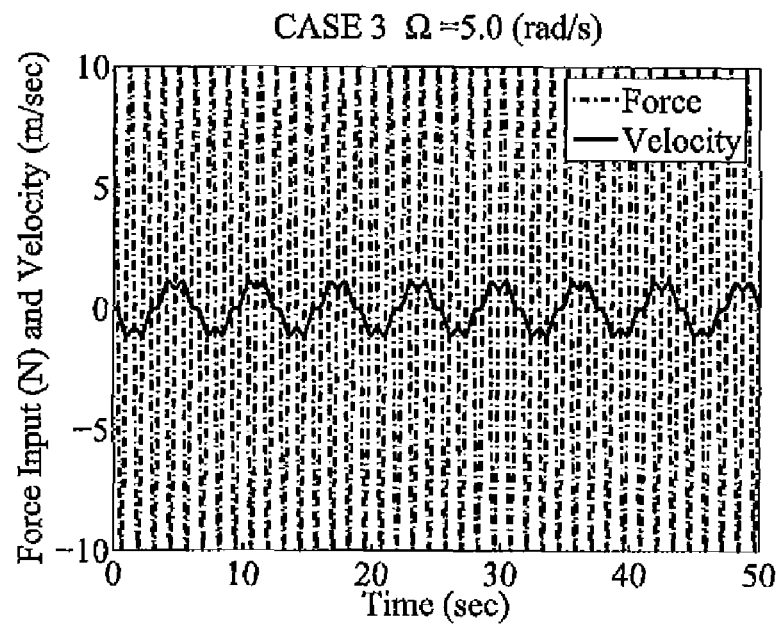
FIGS. 10(a) and (b) show for case 3 entropy control harmonic oscillator results.
Figure 10B:
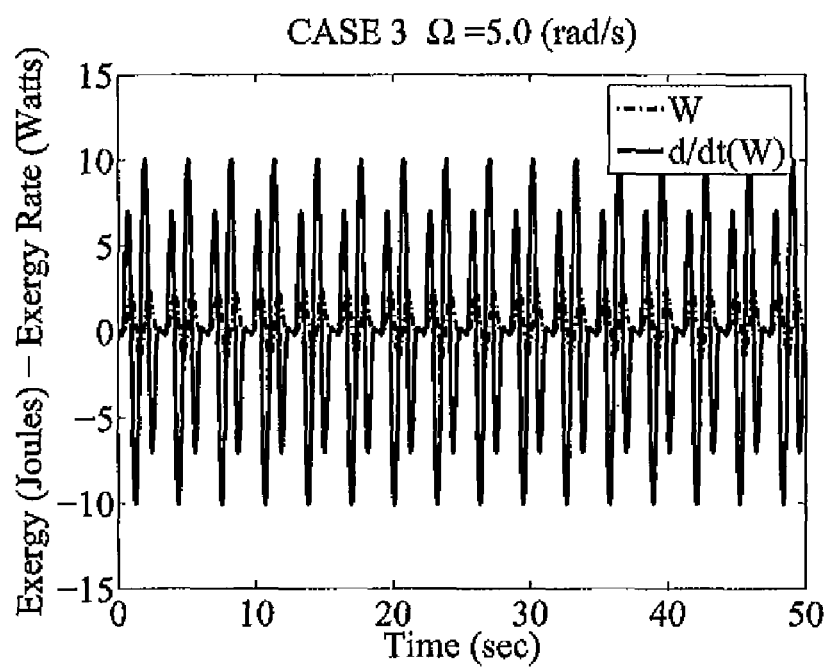
Figure 11A:
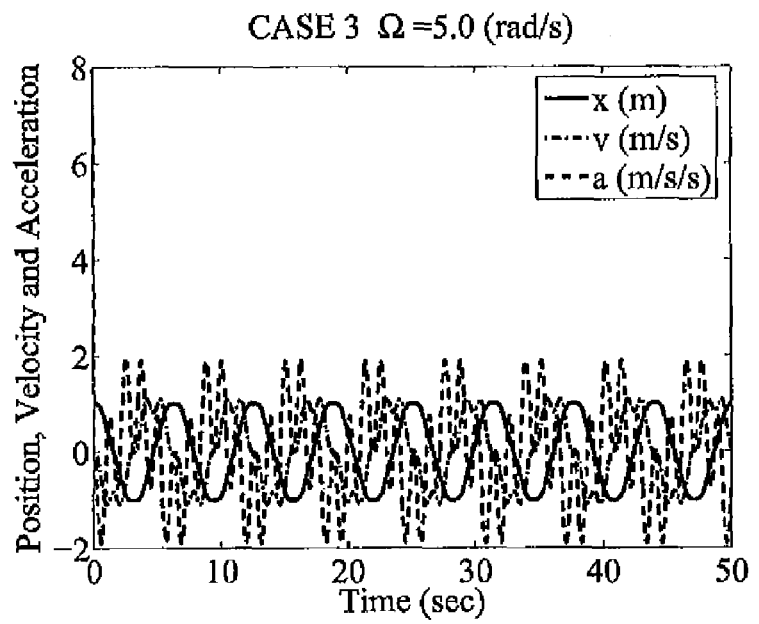
FIGS. 11(a) and (b) show for case 3a entropy control harmonic oscillator results.
Figure 11B:
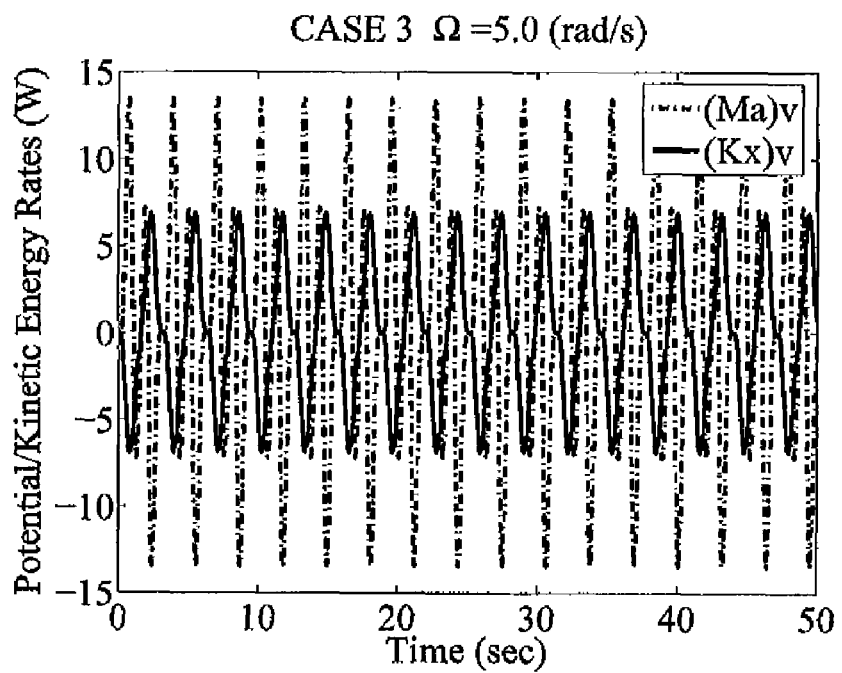

Next, equation (22) with C=0 is explored with an excitation force. The corresponding time derivative of Lyapunov function/Hamiltonian is partitioned as a sum of exergy generation and exergy dissipation as $$\dot{V} = \dot{H} = \dot{W} - T_o\dot{S}_i = \sum_{J=1}^{N} Q_j\dot{q}_j - \sum_{l=N}^{M-N} Q_l\dot{q}_l$$

which yields $T_o\dot{S}_i = 0$ $\dot{W} = F_o \cos \Omega t \cdot \dot{x}$ $(T_o\dot{S}_{rev})_{ave} = (M\ddot{x}\cdot\dot{x} + Kx\cdot\dot{x})_{ave} = 0.$ Numerical simulations are performed for three separate cases with the numerical values listed in Table 1. These include before, at, and after resonance. The harmonic oscillator is subject to the same initial condition as previously. FIGS. 6(a) and (b) plot the input force with the velocity and the exergy and exergy rate for case 1, respectively. FIGS. 7(a) and (b) plot the system responses for position, velocity, and acceleration and the potential and kinetic energy rates for case 1, respectively. The beat frequency cycle is defined at approximately 25 seconds as can be observed by the zero crossings. For case 2, at resonance, the same responses are given and shown in FIGS. 8(a) and (b) and 9(a) and (b), respectively. Note that for a constant amplitude sinusoidal input force the velocity resonance grows asymptotically and unstable along with the system, potential/kinetic energy rates, and exergy/exergy rate responses. The exergy response grows accumulatively. For case 3 corresponding plots are given in FIGS. 10(a) and (b) and 11(a) and (b), respectively. For this case it is after resonance and the system oscillates with an accumulative affect being nulled out at each natural frequency cycle zero crossing, for potential/kinetic rates and exergy/exergy rate responses.

TABLE 1

Mass-spring harmonic oscillator cases

| Case No. | $\Omega$ (rad/sec) | $F_o$, (N) | M (kg) | K (N/m) |
|---|---|---|---|---|
| 1 | 0.75 | 10.0 | 10.0 | 10.0 |
| 2 | 1.0 | 10.0 | 10.0 | 10.0 |
| 3 | 5.0 | 10.0 | 10.0 | 10.0 |

At resonance case 2 demonstrates Corollary 2 such that $(T_o\dot{S}_i)_{ave} = 0$ and $(\dot{W})_{ave} > 0.$  (24)

Figure 12:
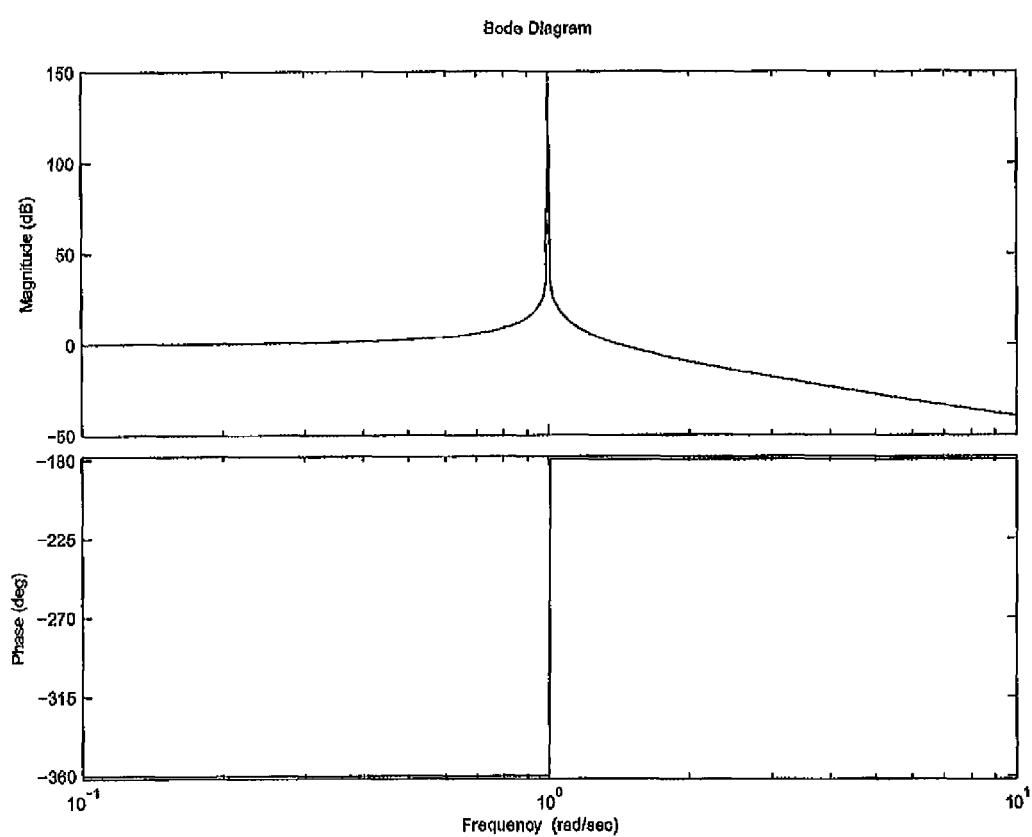
FIG. 12 shows for case 1 Bode response at resonance results.

Case 2 also numerically demonstrated the instability of the harmonic oscillator at resonance which corresponds to the previous analytical analysis and conventional Bode plot (see FIG. 12). Cases one and three are before and after resonance and demonstrate over the proper cycle, the RMS values are $(\dot{W})_{ave} = 0$. This demonstrates Corollary 1 and reproduces the results of a linear system analyses.

EXAMPLE 2

The mass-spring-damper dynamic model (see FIG. 4) is defined as $$M\ddot{x} + C\dot{x} + Kx = u \quad (25)$$

where M, C, K, and u are the mass, damper, stiffness coefficients and external force input terms. The Proportional-Derivative (PD) and Proportional-Integral-Derivative (PID) controller is defined as $$u = -K_P x - K_I \int_0^\tau x \, d\tau - K_D \dot{x} \quad (26)$$

where $K_p$, $K_I$, and $K_D$ are the proportional, integral and derivative controller gains. Also note that for PD control, $K_I = 0.0$.

The passive PD control law is partitioned into terms of exergy dissipation and exergy generation. Now apply exergy/entropy control design and the time derivative of the Lyapunov function/Hamiltonian becomes $$\dot{V} = \dot{H} = \dot{W} - T_o \dot{S}_i = \sum_{j=1}^{N} Q_j \dot{q}_j - \sum_{l=N}^{M-N} Q_l \dot{q}_l \quad (27)$$

which yields $$T_o \dot{S}_i = (C + K_D) \dot{x} \cdot \dot{x}$$

$$\dot{W} = 0$$

$$(T_o \dot{S}_{rev})_{ave} = (M\ddot{x} \cdot \dot{x} + (K + K_P) x \cdot \dot{x})_{ave} = 0. \quad (28)$$

The first term in (28) is identified as a dissipative term composed of the derivative control term along with the damping term. The second term in (28) is zero or no generative terms present, characteristic of any PD control system. The proportional control term is added to the system stiffness term and contributes to the reversible portion or third term in (28). Hence the combined dynamic and PD control system is categorized as a passively stable system.

Figure 13A:
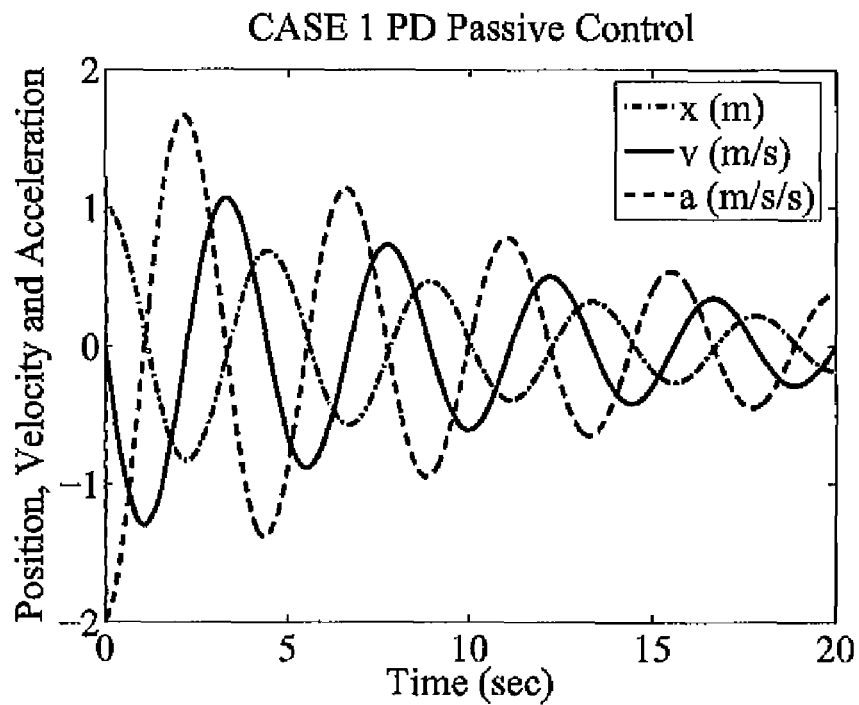
FIGS. 13(a) and (b) show for case 1 mass-spring-damper with PD control numerical results.
Figure 13B:
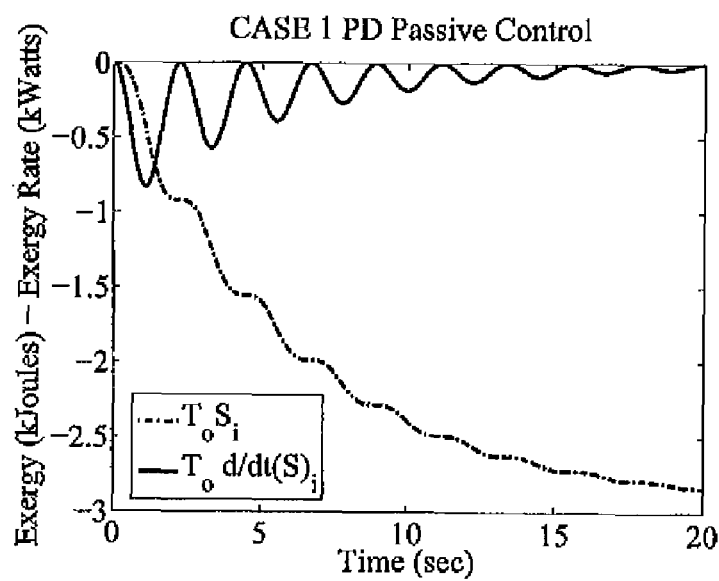
Figure 14A:
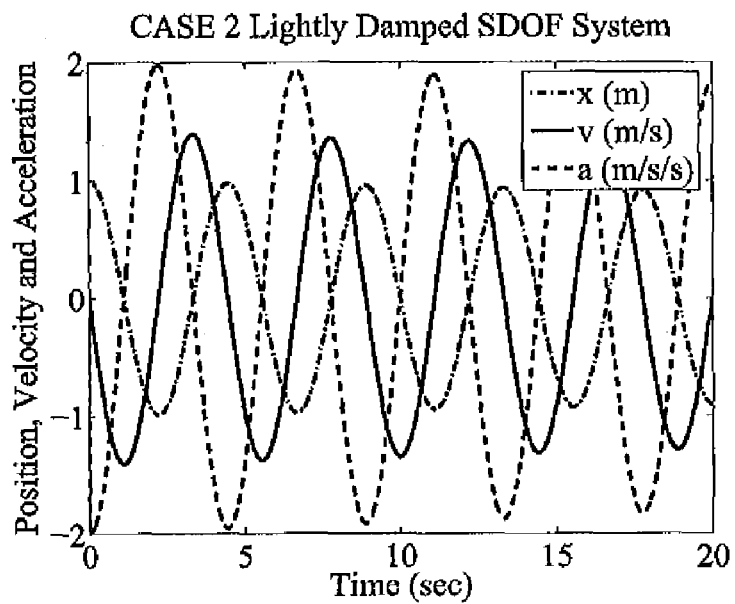
FIGS. 14(a) and (b) show for case 2 mass-spring-damper with PD control numerical results.
Figure 14B:
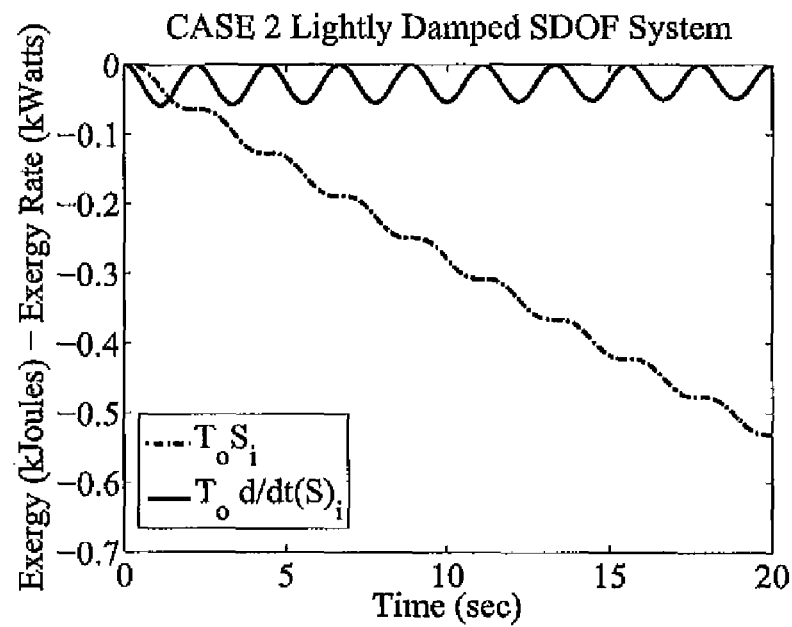
Figure 15A:
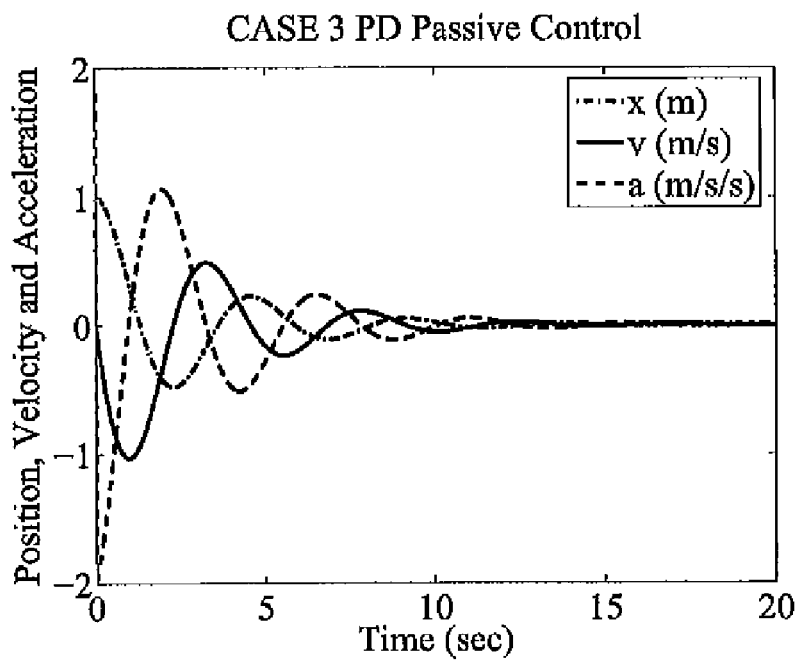
FIGS. 15(a) and (b) show for case 3 mass-spring-damper with PD control numerical results.
Figure 15B:
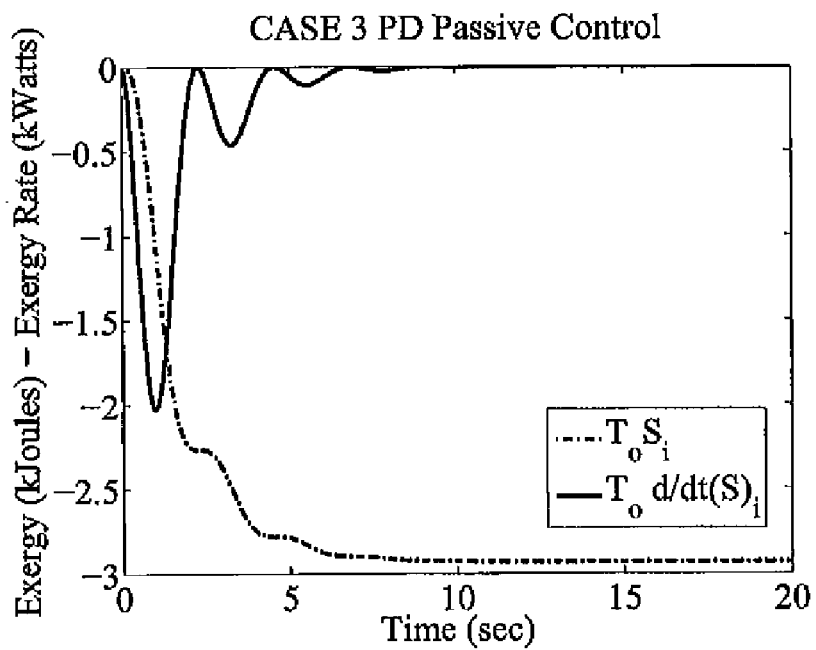

Numerical simulations are performed for three separate PD control regulator cases with the numerical values listed in Table 2. These include three different levels of damping. The mass-spring-damper system is subject to an initial condition of $x_0 = 1.0$. The position, velocity, and acceleration responses along with the exergy and exergy rate responses are given in FIGS. 13(a) and (b), 14(a) and (b), and 15(a) and (b) for cases 1, 2, and 3, respectively. In all cases, the exergy rate is negative or dissipative and all the responses are stable and decaying as one would expect for PD passivity control.

TABLE 2

Mass-spring-damper model and PD/PID control system gains

| Case No. | $K_P$ (kg/s²) | $K_{I(PD)}/K_{I(PID)}$ (kg/s³) | $K_{D(PD)}/K_{D(PID)}$ (kg/s) | M (kg) | K (kg/s²) | C (kg/s) |
|---|---|---|---|---|---|---|
| 1A | 10.0 | NA/1.0 | NA/0.0 | 10.0 | 10.0 | 0.0 |
| 1 | 10.0 | 0.0/1.0 | 1.6/2.0 | 10.0 | 10.0 | 0.1 |
| 2 | 10.0 | 0.0/1.0 | 0.0/0.4 | 10.0 | 10.0 | 0.1 |
| 3 | 10.0 | 0.0/1.0 | 6.4/0.0 | 10.0 | 10.0 | 0.1 |

All three cases demonstrate Corollary 3 such that $$(T_o \dot{S}_i)_{ave} > 0 \text{ and } \dot{W} = 0. \quad (29)$$

It is well known that PD control has been proven to be stable based on passivity control theory. Exergy/entropy control design has shown the PD controller to be passive stable and that conventional passivity control theory is a subset of this general development.

The PID control law is partitioned into terms of exergy generation and exergy dissipation. Now apply exergy/entropy control design and the time derivative of the Lyapunov function/Hamiltonian becomes $$\dot{V} = \dot{H} = \dot{W} - T_o \dot{S}_i = \sum_{j=1}^{N} Q_j \dot{q}_j - \sum_{l=N}^{M-N} Q_l \dot{q}_l \quad (30)$$

which yields $$T_o \dot{S}_i = (C + K_D) \dot{x} \cdot \dot{x} \quad (31)$$

$$\dot{W} = -K_I \int_0^\tau x \, d\tau \cdot \dot{x}$$

$$(T_o \dot{S}_{rev})_{ave} = (M\ddot{x} \cdot \dot{x} + (K + K_P) x \cdot \dot{x})_{ave} = 0.$$

Once again, the first term in (31) is identified as a dissipative term composed of the derivative control term along with the damping term. The second term in (31) is the integral action and is identified as the generative input. Note that the proportional control term is added to the system stiffness term and contributes to the reversible portion of the third term in (31).

For PID control the stability boundary is determined as $$\dot{V} = 0 = \dot{W} - T_o \dot{S}_i \; \forall t_0 \leq t \leq t_{final}$$

and is also considered a special case of the average power. In general for nonlinear systems, the average power terms will need to be taken into account.

Figure 16A:
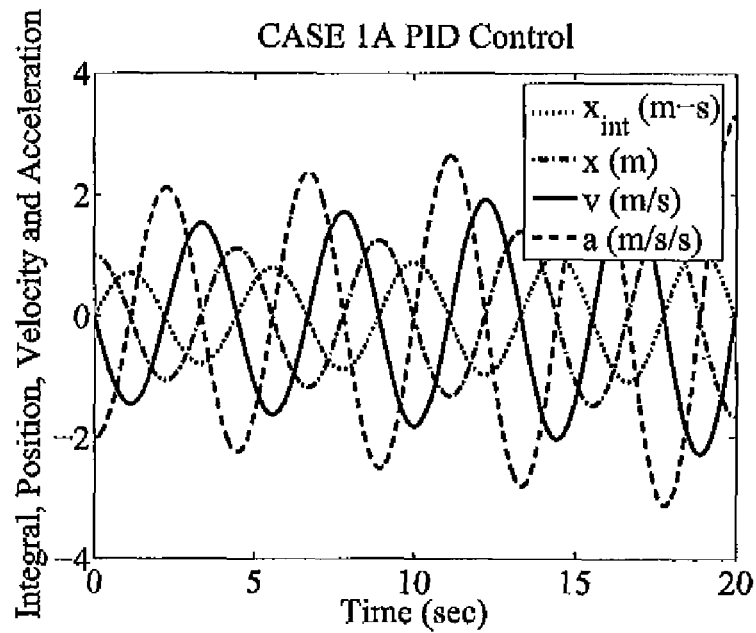
FIGS. 16(a) and (b) show for case 1a mass-spring-damper with PID control numerical results.
Figure 16B:
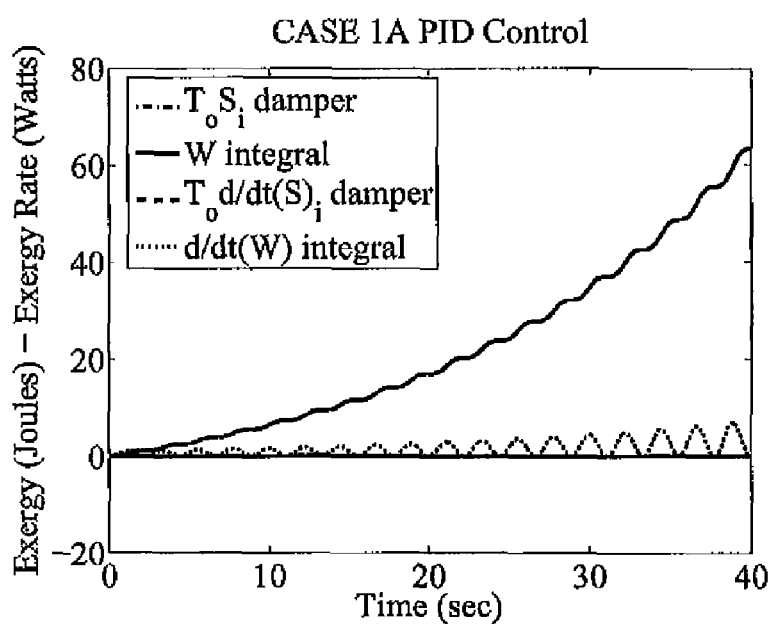
Figure 17A:
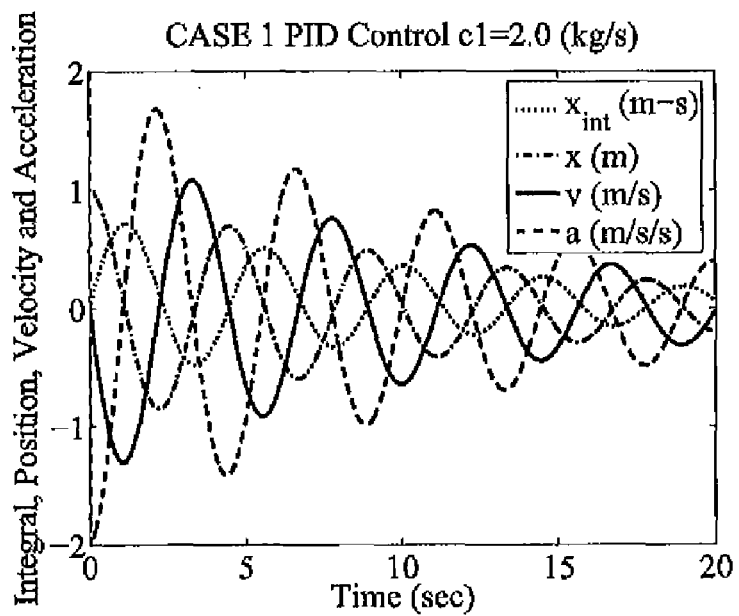
FIGS. 17(a) and (b) show for case 1 mass-spring-damper with PID control numerical results.
Figure 17B:
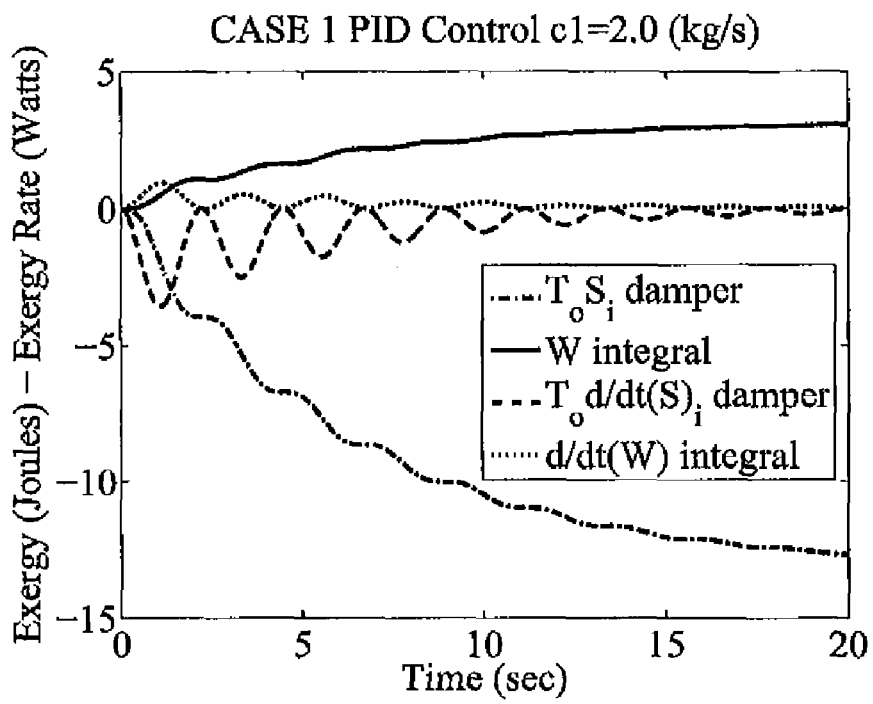
Figure 18A:
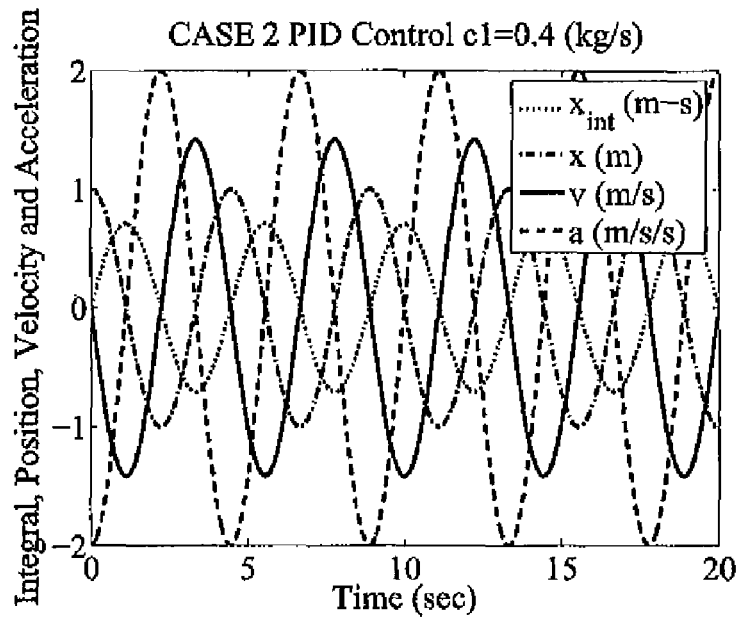
FIGS. 18(a) and (b) show for case 2 mass-spring-damper with PID control numerical results.
Figure 18B:
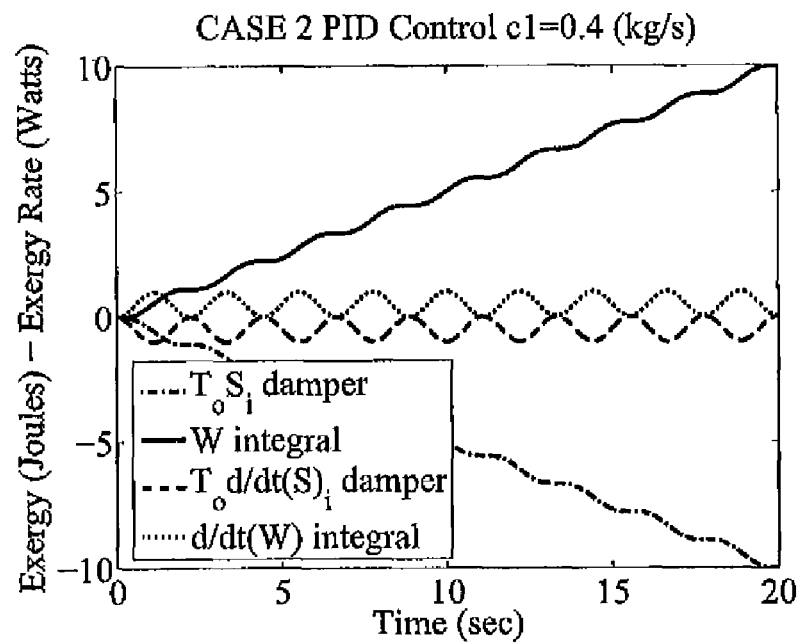
Figure 19:
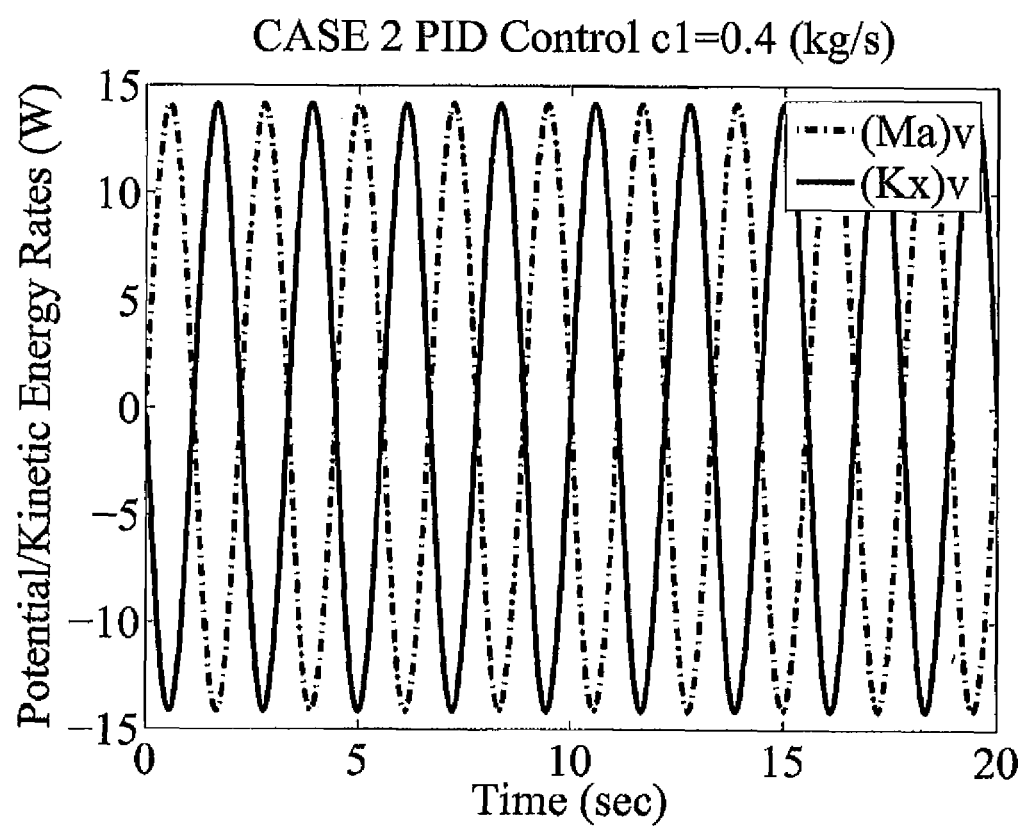
FIG. 19 shows for case 2a mass-spring-damper spring restoring and inertial effects numerical results.
Figure 20A:
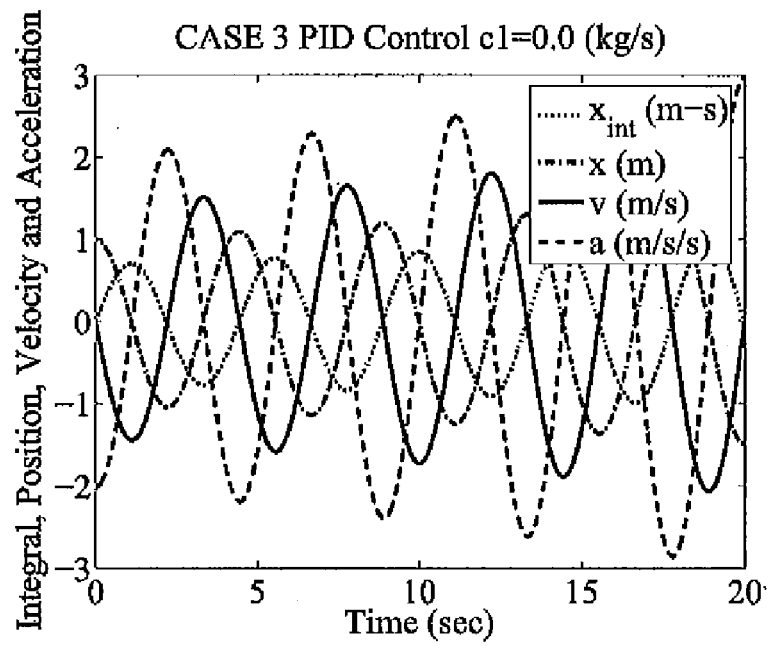
FIGS. 20(a) and (b) show for case 3 mass-spring-damper with PID control numerical results.
Figure 20B:
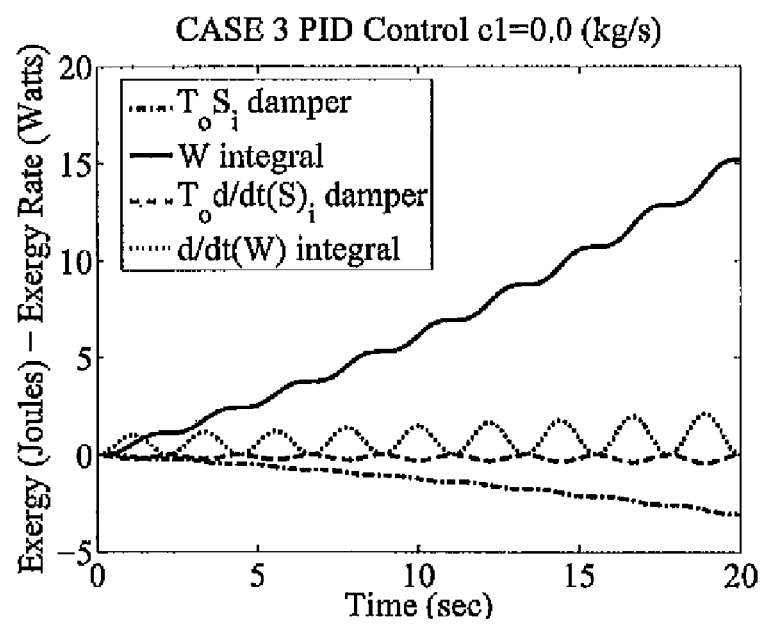
Figure 21A:
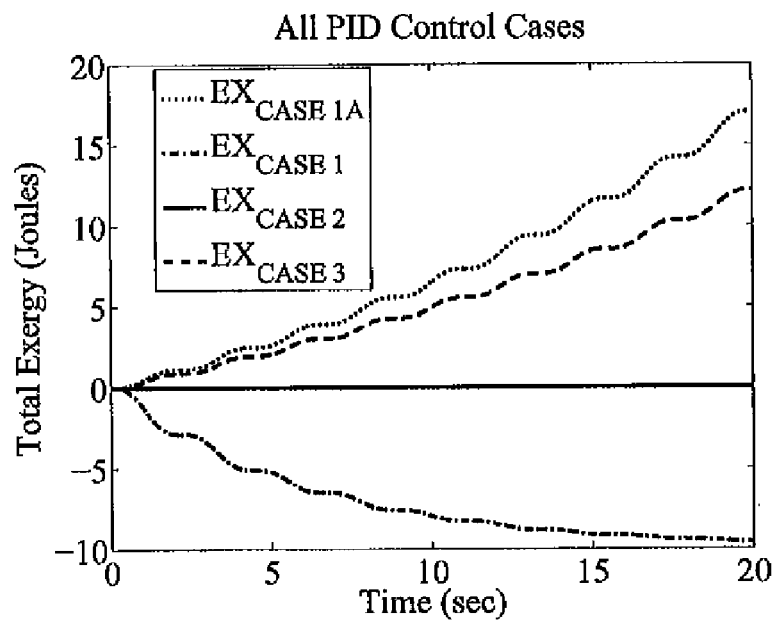
FIGS. 21(a) and (b) show for all cases mass-spring-damper with PID control numerical results.
Figure 21B:
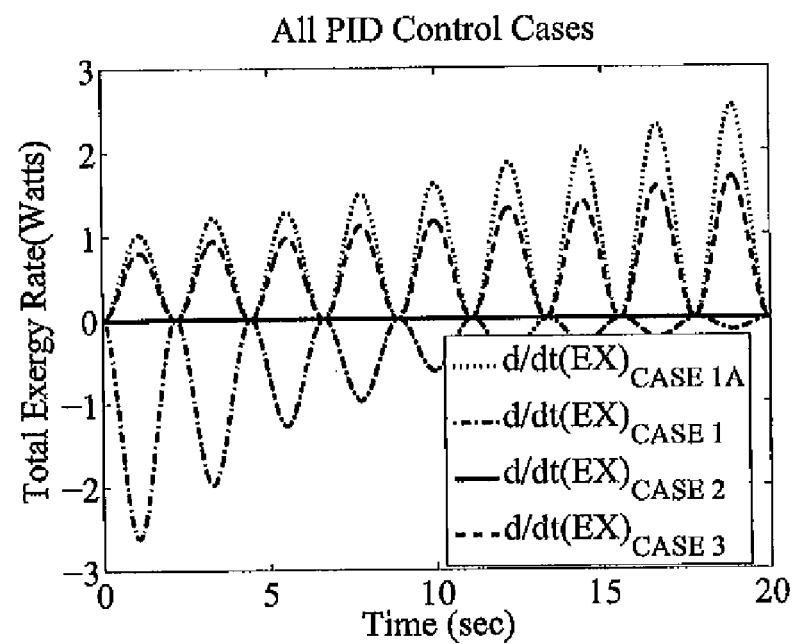

Numerical simulations are performed for four separate PID control regulator cases with the numerical values listed in Table 2. The mass-spring-damper system is subject to an initial condition of $x_0 = 1.0$. For case 1A, pure generative input is demonstrated where growing state oscillations (see FIG. 16(a)) and positively increasing values are observed in the responses for exergy and exergy rate (see FIG. 16(b)). The system has experienced pure input without any dissipation mechanisms to damp out the exergy coming into the system and looks very similar to the forced harmonic oscillator at resonance. For case 1 the integral of position, position, velocity, and acceleration responses along with the exergy and exergy rate responses are plotted in FIGS. 17(a) and (b). For this case, the dissipative term is greater than the generative term. This is observed from the decaying system responses. In case 2 the system responses along with the exergy and exergy rate responses are shown in FIGS. 18(a) and (b). In this case, the dissipative term is equal to the generative term. This results in system responses that do not decay or have constant oscillatory behavior. Further investigation of the exergy and exergy rate responses show that the mirror images for dissipation and generation will cancel each other out. For case 2 the potential and kinetic energy rate responses (see FIGS. 19(a) and (b)) are shown to have zero contribution or are reversible over each cycle. In case 3 the system responses along with the exergy and exergy rate responses are shown in FIGS. 20(a) and (b). In this case, the dissipative term is less than the generative term. This results in system responses with increasing oscillatory behavior. In addition, the sum of generative and dissipative terms are increasingly positive, hence exergy is being pumped into the system at a greater rate than can be dissipated. In conclusion, FIGS. 21(a) and (b) show the responses for the total exergy and exergy rates with respect to each case. Again, for case 2 a balance or boundary (neutral stability) can be observed.

The three cases for the PID control regulator mass-spring-damper dynamic system demonstrate the three subcases for Corollary 4: Given apriori $T_o\dot{S}_i>0$ and $\dot{W}>0$ then the mass-spring-damper with PID control showed the following:

4.1 Case 1 yielded $(T_o\dot{S}_i)_{ave}>(\dot{W})_{ave}$; asymptotic stability; damped stable response; and demonstration of Corollary 4.1.

4.2 Case 2 yielded $(T_o\dot{S}_i)_{ave}=(\dot{W})_{ave}$; neutral stability; and demonstration of Corollary 4.2. This case is the dividing line where derivative and integral action cancel each other out.

4.3 Case 3 yielded $(T_o\dot{S}_i)_{ave}<(\dot{W})_{ave}$; increasing unstable system; and demonstration of Corollary 4.3.

For PID control validation, first, compare a PID controller $$M\ddot{x} + C\dot{x} + Kx = u_{PID} = -K_P x - K_I \int_o^t x d\tau - K_D \dot{x} \quad (32)$$

with Lag-stabilization $$m\ddot{x}+kx==u_{LS}=-c\dot{x}(t-\tau).$$

Note that from PID the PD portions contribute to system stiffness and damping. What does the "I" or integral portion contribute to Negative damping. Since lag-stabilization was shown to phase shift x to $\dot{x}$, some prescribed amount of damping, then for the "integration" of x, the phase shift would be proportional to $-\dot{x}$. Recognizing this then $$\alpha \int_o^t x d\tau = -\dot{x}.$$

Differentiating yields $$\alpha x = -\ddot{x} \text{ whichimpliesthat } \ddot{x}+\alpha x=0$$

for no net damping (neutral stability) and where $$\alpha = \omega^2 = \frac{K + K_P}{M}.$$

For the mass-spring-damper system with PID control (32) the stability boundary is at $$-T_o\dot{S}_i+\dot{W}=0$$

or $$T_o\dot{S}_i=\dot{W}$$

where the averages can be removed for this linear system. Substituting the appropriate terms from (32) gives $$[(C + K_D)\dot{x}]\dot{x} = -\left[K_I \int_o^t x d\tau\right]\dot{x}$$

then rearranging as $$\int_o^t x d\tau = -\frac{(C + K_D)}{K_I}\dot{x}$$

and differentiating both sides gives $$x = -\frac{(C + K_D)}{K_I}\ddot{x}$$

which results in $$\ddot{x}+\omega^2 x=0 \text{ whichimpliesthat}$$

$$\omega^2 = \frac{K_I}{(C + K_D)}.$$

Next this result is further clarified with a conventional Routh-Hurwitz analysis.

First, convert the combined mass-spring-damper PID control system into the following equivalent third-order system $$M\ddot{x} + (C + K_D)\dot{x} + (K + K_P)x + K_I \int_o^t x d\tau = 0$$

Next, invoke the following change of variable as $$y = \int_o^t x d\tau$$

gives $$\dddot{y} + \frac{(C + K_D)}{M}\ddot{y} + \frac{(K + K_P)}{M}\dot{y} + \frac{K_I}{M}y = 0$$

and transforming to the s-domain yields $$s^3 + \frac{(C + K_D)}{M}s^2 + \frac{(K + K_P)}{M}s + \frac{K_I}{M}y = 0.$$

For the third-order system to be stable, the Routh-Hurwitz analysis results in the following necessary and sufficient conditions:

1. All the polynomial coefficients must be positive and
2.

$$\left(\frac{(C + K_D)}{M}\right)\left(\frac{(K + K_P)}{M}\right) \geq \frac{K_I}{M}.$$

For the specific equality condition:

$$\left(\frac{(C + K_D)}{M}\right)\left(\frac{(K + K_P)}{M}\right) = \frac{K_I}{M}$$

implies that $$\frac{K_I}{(C+K_D)} = \frac{(K+K_P)}{M} = \omega^2.$$

This result is the marginal or neutral stability boundary which agrees with the previous lag stabilized and exergy/entropy control results:

$$\alpha = \omega^2.$$

Also note that for the previous PID control numerical simulation results that case 1 is asymptotically stable, case 2 is neutrally stable, and case 3 is unstable which matches the analysis results.

EXAMPLE 3

Figure 22:
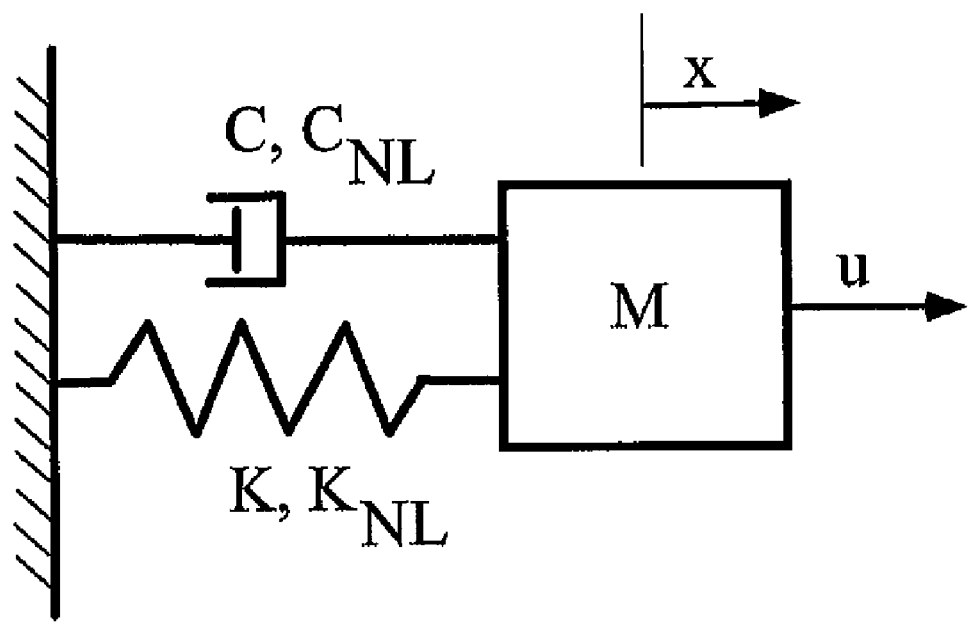
FIG. 22 illustrates a Duffing oscillator/Coulomb friction system.

This example is the design of a control law for a single degree of freedom nonlinear oscillator. The Duffing oscillator/Coulomb friction dynamic model (see FIG. 22) is defined as $$M\ddot{x} + C\dot{x} + C_{NL}\text{sign}(\dot{x}) + Kx + K_{NL}x^3 = u \quad (33)$$

where M, C, K, and u are the mass, damper, stiffness coefficients and external force input terms. The nonlinear stiffness and Coulomb friction coefficients are $K_{NL}$ and $C_{NL}$, respectively. The PID controller is defined as $$u = -K_P x - K_I \int_0^t x\,d\tau - K_D \dot{x} \quad (34)$$

where $K_P$, $K_I$, and $K_D$ are the proportional, integral and derivative controller gains.

Initially, the nonlinear Duffing oscillator is investigated as a neutrally stable, reversible conservative system or $$M\ddot{x} + Kx + K_{NL}x^3 = -K_P x$$

subject to the initial condition $x(0) = x_o = 1.0$. Now apply exergy/entropy control design and the derivative of the Lyapunov function/Hamiltonian becomes $$\dot{V} = \dot{H} = \dot{W} - T_o \dot{S}_i = \sum_{j=1}^{N} Q_j \dot{q}_j - \sum_{l=N}^{M-N} Q_l \dot{q}_l \quad (35)$$

which yields $$T_o \dot{S}_i = 0$$

$$\dot{W} = 0$$

$$(T_o \dot{S}_{rev})_{ave} = (M\ddot{x}\cdot\dot{x} + (K+K_P)x\cdot\dot{x} + K_{NL}x^3\cdot\dot{x})_{ave} = 0.$$

Figure 23A:
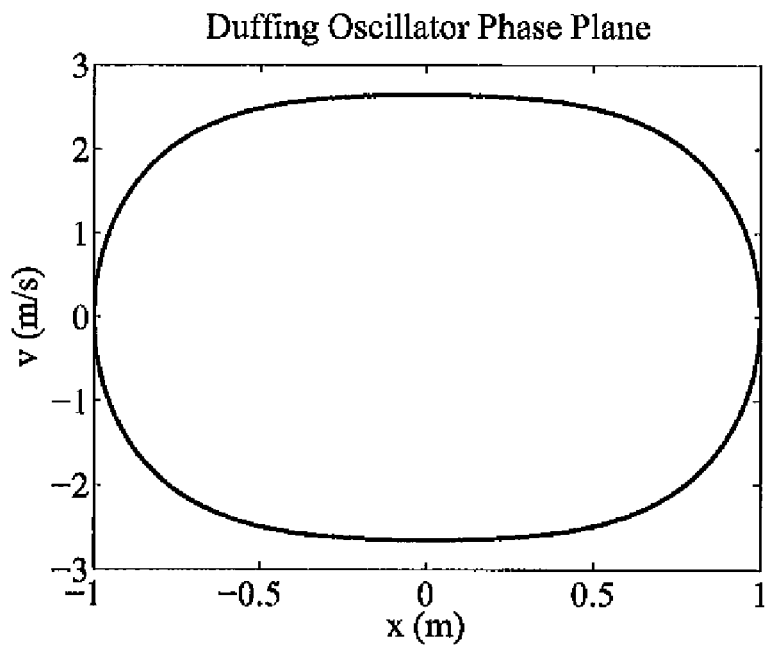
FIGS. 23(a) and (b) show for case 1 Duffing oscillator/Coulomb friction with PID control numerical results.
Figure 23B:
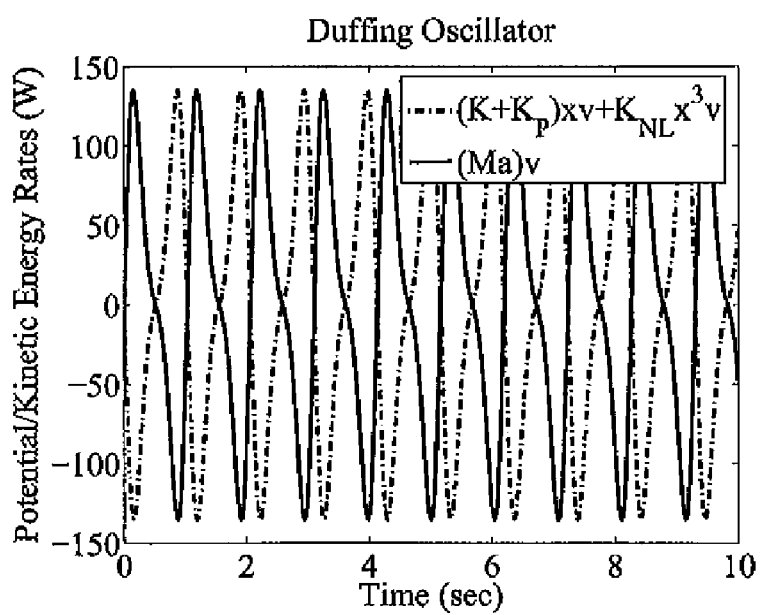
Figure 24A:
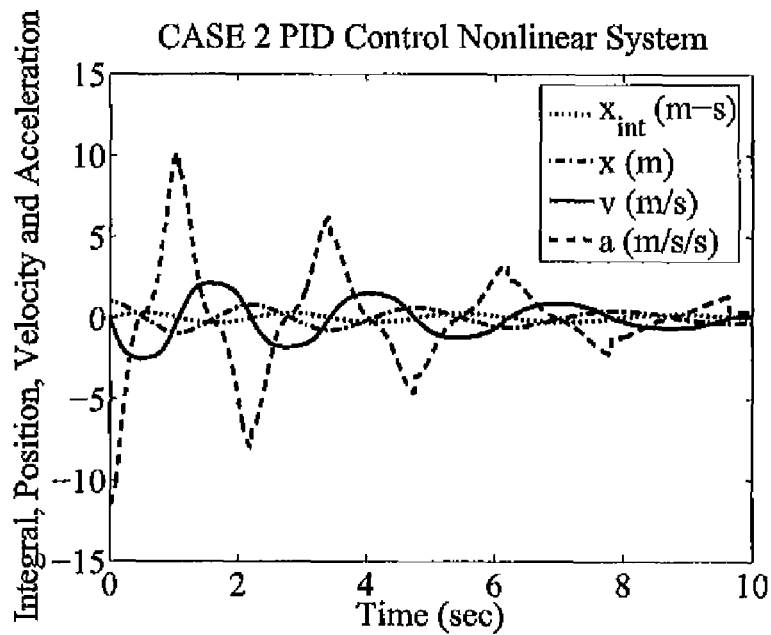
FIGS. 24(a) and (b) show for case 2 Duffing oscillator/Coulomb friction with PID control numerical results.
Figure 24B:
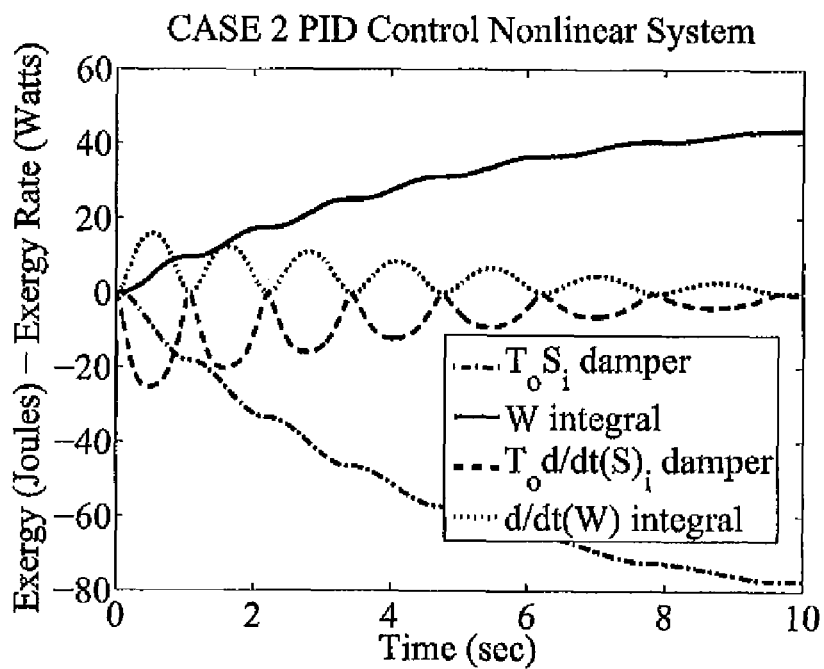

Numerical simulations are performed with the numerical values listed in Table 3. For this initial Case 1 the phase plane plot and the potential and kinetic energy rates plots are shown in FIGS. 23(a) and (b). This run demonstrates Corollary 1 and a stable orbit for the nonlinear system with offsetting potential and kinetic energy rates responses.

TABLE 3

Duffing oscillator/Coulomb friction model and PID control system gains

| Case No. | $K_P$ (kg/s²) | $K_I$ (kg/s³) | $K_D$ (kg/s) | M (kg) | K (kg/s²) | C (kg/s) | $K_{NL}$ (N/m³) | $C_{NL}$ (N) |
|---|---|---|---|---|---|---|---|---|
| 1 | 10.0 | 0.0 | 0.0 | 10.0 | 10.0 | 0.0 | 100.0 | 0.0 |
| 2 | 10.0 | 20.0 | 2.0 | 10.0 | 10.0 | 0.1 | 100.0 | 5.0 |
| 3 | 10.0 | 40.05 | 2.0 | 10.0 | 10.0 | 0.1 | 100.0 | 5.0 |
| 4 | 10.0 | 80.0 | 2.0 | 10.0 | 10.0 | 0.1 | 100.0 | 5.0 |

Next, consider the additional PID and Coulomb friction effects applied to the Duffing oscillator and partition into exergy generation and exergy dissipation terms. Now apply the exergy/entropy control design and the derivative of the Lyapunov function/Hamiltonian becomes $$\dot{V} = \dot{H} = \dot{W} - T_o \dot{S}_i = \sum_{j=1}^{N} Q_j \dot{q}_j - \sum_{l=N}^{M-N} Q_l \dot{q}_l \quad (36)$$

which yields $$T_o \dot{S}_i = (C + K_D)\dot{x}\cdot\dot{x} + C_{NL}\text{sign}(\dot{x})\cdot\dot{x}$$

$$\dot{W} = -K_I \int_o^t x\,d\tau \cdot \dot{x}$$

$$(T_o \dot{S}_{rev})_{ave} = (M\ddot{x}\cdot\dot{x} + (K+K_P)x\cdot\dot{x} + K_{NL}x^3\cdot\dot{x})_{ave} = 0.$$

To determine the nonlinear stability boundary from the exergy/entropy control design $$\dot{V} = \dot{H} = \dot{W} - T_o\dot{S}_i$$

which gives $$(\dot{W})_{ave} = (T_o\dot{S}_i)_{ave}.$$

Substituting the actual terms yields the following:

$$\left[-K_I\int_o^t x\,d\tau\cdot\dot{x}\right]_{ave} = [(C+K_D)\dot{x}\cdot\dot{x} + C_{NL}\text{sign}(\dot{x})\cdot\dot{x}]_{ave} \quad (37)$$

which is the nonlinear stability boundary. To best understand how the boundary is determined, concepts and analogies from electric AC power have been introduced earlier. Essentially, when the average power$_{in}$ is equivalent to the average power$_{dissipated}$ over a cycle, then the system is operating at the stability boundary. Later, in the exergy and exergy rate responses for the nonlinear system, one may observe that the area under the curves for the exergy rate generation and the exergy rate dissipation are equivalent and for the corresponding exergy responses the slopes will be equal and opposite. This helps to explain why PID control works well for nonlinear systems.

Numerical simulations are performed to demonstrate where the nonlinear stability boundary lies for the Duffing oscillator/Coulomb friction dynamic model subject to PID control. Three separate cases are conducted with the numerical values listed in Table 3. The nonlinear system is subject to an initial condition of $x_o = 1.0$. For case 2 the integral of position, position, velocity, and acceleration responses along with the exergy and exergy rate responses are plotted in FIGS.

Figure 25A:
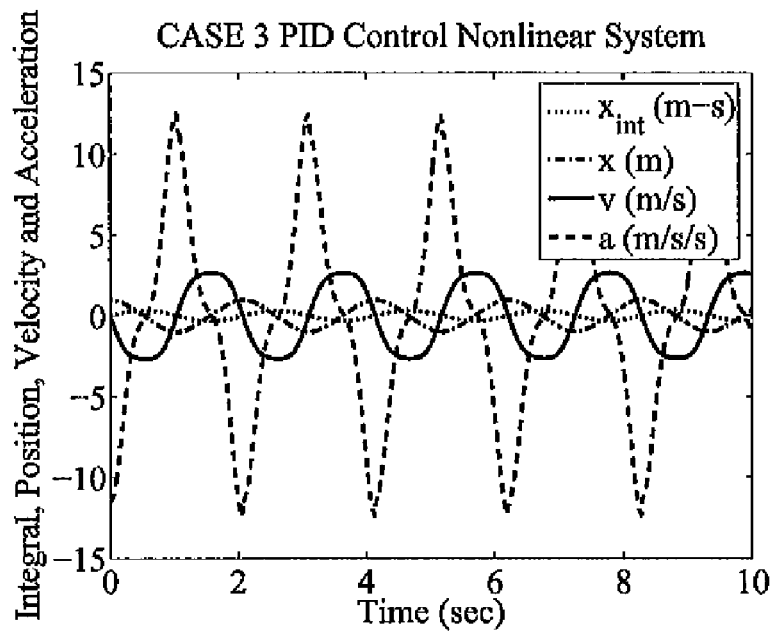
FIGS. 25(a) and (b) show for case 3 Duffing oscillator/Coulomb friction with PID control numerical results.
Figure 25B:
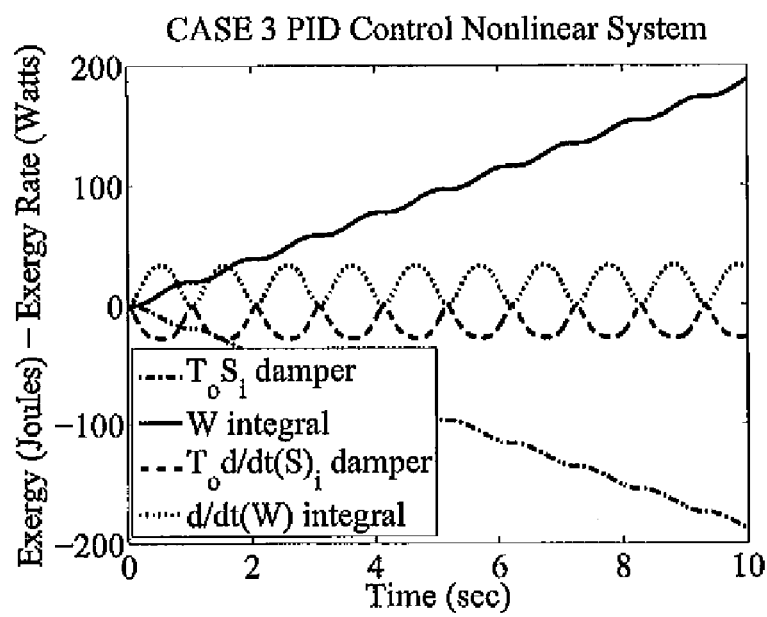
Figure 26A:
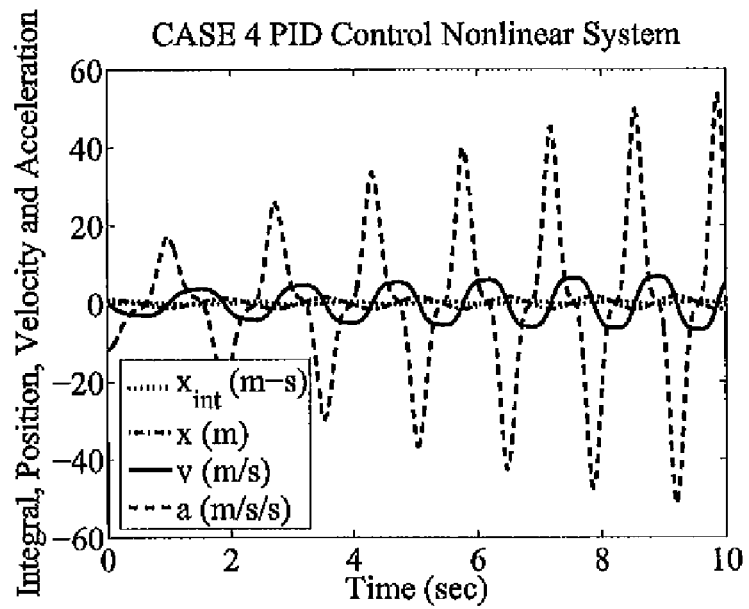
FIGS. 26(a) and (b) show for case 4 Duffing oscillator/Coulomb friction with PID control numerical results.
Figure 26B:
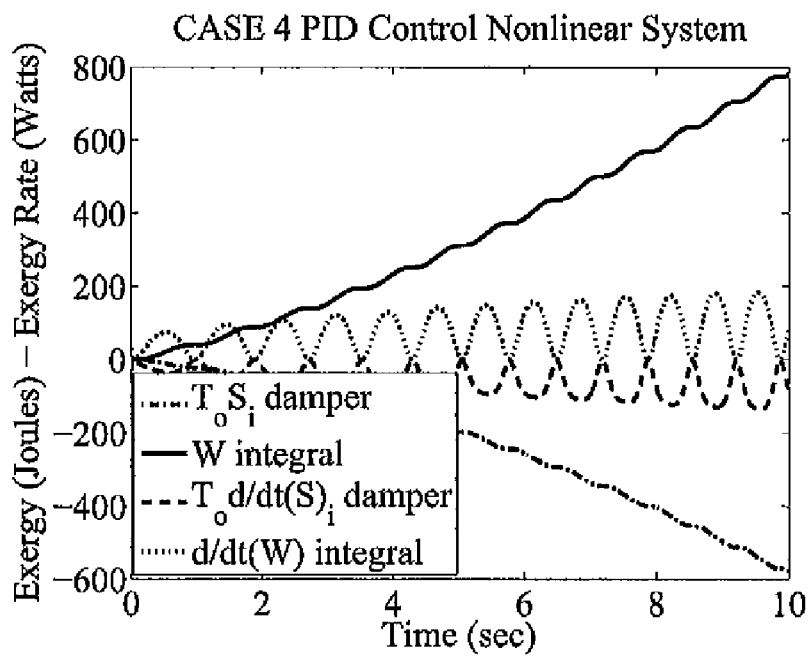
Figure 27A:
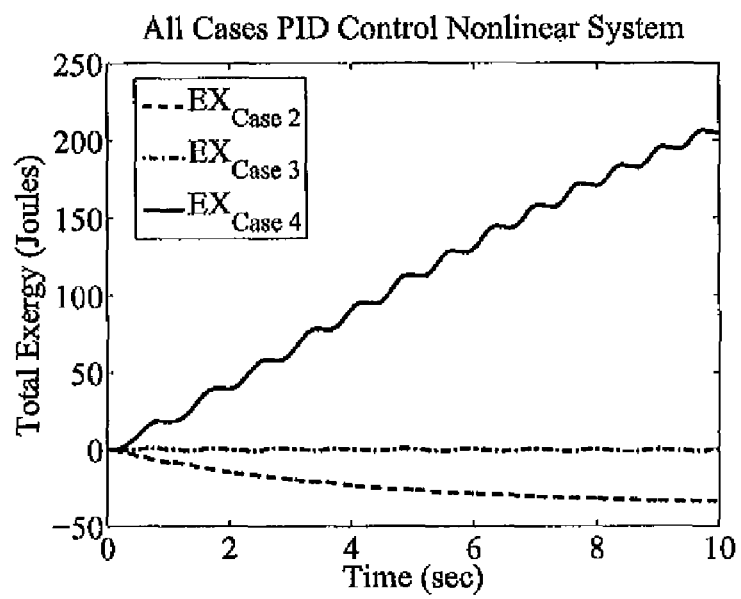
FIGS. 27(a) and (b) show for all cases Duffing oscillator/Coulomb friction numerical results.
Figure 27B:
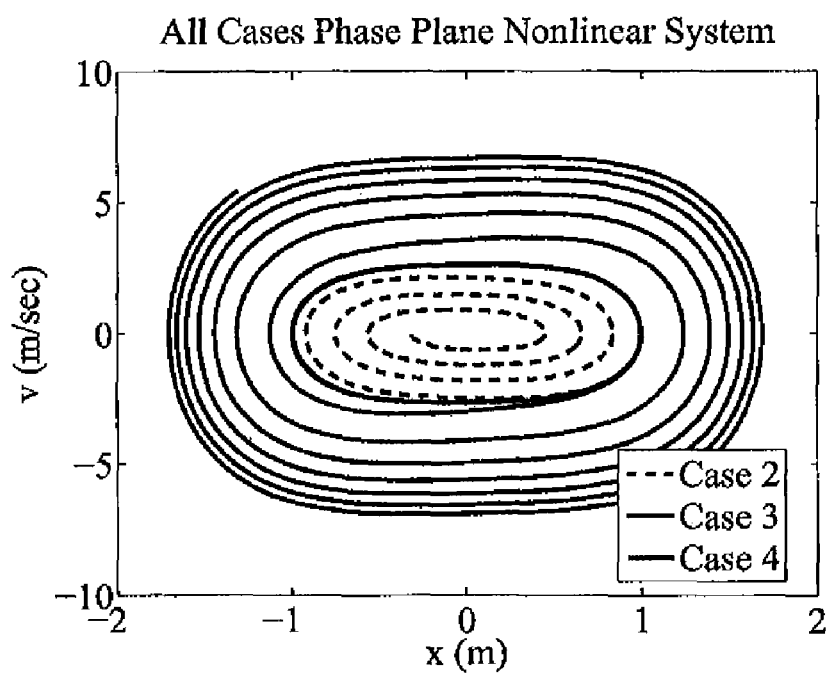

24(a) and (b). For this case, the dissipative term is greater than the generative term. This is observed from the decaying system responses. In case 3 the system responses along with the exergy and exergy rate responses are shown in FIGS. 25(a) and (b). In this case, the average exergy slopes and integrated power areas for the dissipative and generative terms are equivalent which demonstrates (37). This results in system responses that do not decay, displaying constant nonlinear oscillatory behavior. In final case 4, the system responses along with the exergy and exergy rate responses are shown in FIGS. 26(a) and (b). In this case, the dissipative term is less than the generative term which results in a system response with increasing nonlinear oscillatory behavior. In conclusion, FIGS. 27(a) and (b) show the responses for the total exergy with respect to each case along with the phase plane plot for the nonlinear system. For case 3 the nonlinear stability boundary (or neutral stability) is characteristic of an average zero output for the total exergy response or validation of (37). For the phase plane plot, case 2 demonstrates an asymptotically stable decaying response, case 3 a neutrally stable orbital response, and case 4 an asymptotically unstable increasing orbit response.

All three cases for the PID control regulator Duffing oscillator/Coulomb friction dynamic system demonstrates the three subcases for Corollary 4: Given apriori $(T_o \dot{S}_i)_{ave} > 0$ and $(\dot{W})_{ave} > 0$ then the nonlinear system, Duffing oscillator/Coulomb friction with PID control showed the following:

4.1 Case 2 yielded $(T_o \dot{S}_i)_{ave} > (\dot{W})_{ave}$; asymptotic stability; damped stable nonlinear response and demonstration of Corollary 4.1.

4.2 Case 3 yielded $(T_o \dot{S}_i)_{ave} = (\dot{W})_{ave}$; neutral stability; and demonstration of Corollary 4.2. This case is the nonlinear stability boundary where dissipation and generation terms cancel each other out on the average.

4.3 Case 3 yielded $(T_o \dot{S}_i)_{ave} < (\dot{W})_{ave}$; increasingly unstable towards another orbit; and demonstration of Corollary 4.3.

In addition, the boundary condition can be used to identify different operating regions for systems that may need to be gain scheduled. For example, the integral gain, in general may be a function of many different parameters $$K_I = K_I(x_o, \dot{x}_o, C, C_{NL}, K_D).$$

Figure 28:
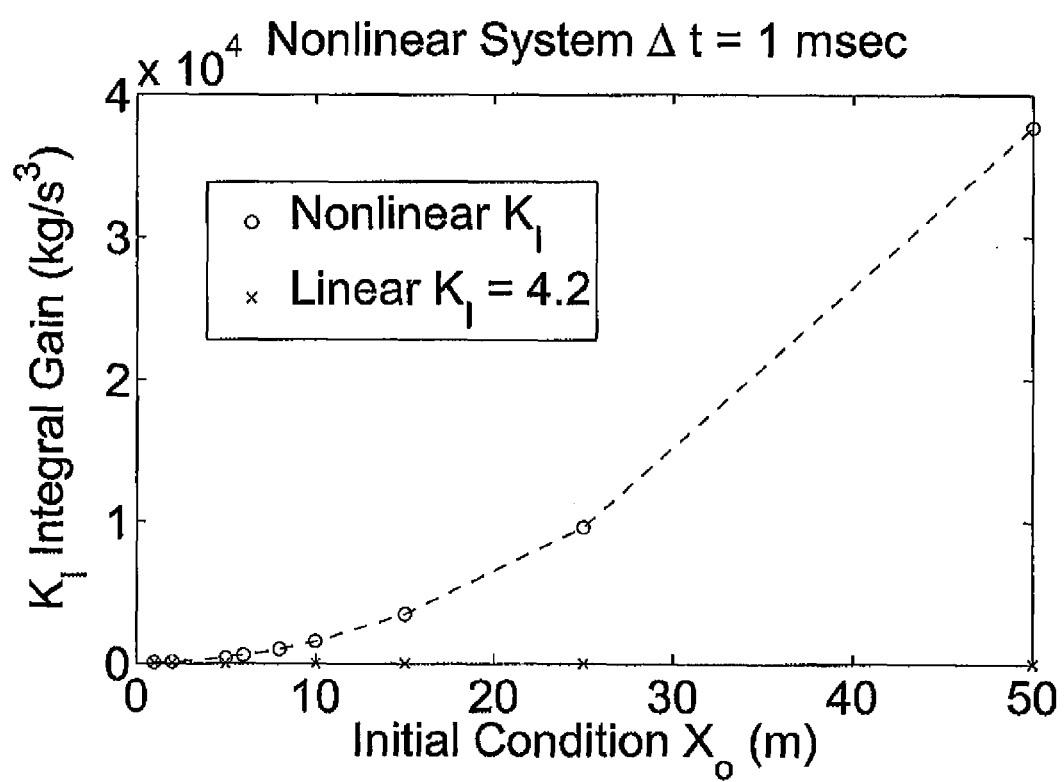
FIG. 28 illustrates gain scheduling with the integral gain as a function of initial conditions.

For the purpose of illustration the integral gain was investigated for different initial conditions, $x_o$, while holding all the other possible parameters constant. The results are shown in FIG. 28. For several varying initial conditions for $x_o$, at the stability boundary condition each $K_I$ was determined. The corresponding linear system resulted in constant $K_I$ values which is characteristic of a linear system. The gain scheduling is due to the nonlinear spring. It changes the limit cycle behavior as a function of store exergy. In the next example, exergy/entropy control design is applied to the tracking control problem.

EXAMPLE 4

The tracking controller design according to the invention begins with picking a Lyapunov function that is the error energy and the second variation of the Hamiltonian.

$$V = \frac{1}{2} \delta^2 H \tag{38}$$

which is positive definite. The time derivative is $$\dot{V} = \frac{d}{dt}\left(\frac{1}{2}\delta^2 H\right) = \delta \dot{H} \tag{39}$$

$$= \Delta \dot{W} - T_o \Delta \dot{S}_i = \sum_{j=1}^{N} \delta Q_j \delta \dot{q}_j - \sum_{l=N}^{M-N} \delta Q_l \delta \dot{q}_l$$

that is subject to the following general necessary and sufficient conditions:

$T_o \Delta \dot{S}_i \geq 0$ Positive semi-definite, always true $\Delta \dot{W} \geq 0$ Positive semi-definite; exergy pumped into the system.

Similar arguments can be made for the corollaries as compared to the earlier regulator problem cases.

The formation is identical to the regulator problem with the exception that for the nonlinear case additional cross-terms will need to be accommodated.

For the tracking controller, the variations are about a reference input trajectory where the Hamiltonian is viewed as $H = H_r + \delta H.$ This is best demonstrated by the following example. Initially, the mass-spring-damper (see FIG. 4) dynamic model (25) is revisited and a tracking PID control law is applied. For tracking control, first define the perturbation variables to be $x = x_r + \delta x$ $\dot{x} = \dot{x}_r + \delta \dot{x}$ $\ddot{x} = \ddot{x}_r + \delta \ddot{x}$ $u = u_r + \delta u$ with the reference control given as $u_r = M\ddot{x}_r + C\dot{x}_r + Kx_r.$ Then the PID tracking controller is $$\delta u = -K_P(\delta x) - K_I \int_o^t (\delta x) d\tau - K_D(\delta \dot{x})$$

where $K_P$, $K_I$, and $K_D$ are the proportional, integral, and derivative controller gains.

Now investigate the PID tracking control in terms of exergy dissipation and exergy generation. The derivative of the Lyapunov function/Hamiltonian becomes $$\dot{V} = \delta \dot{H} = \Delta \dot{W} - T_o \Delta \dot{S}_i = \sum_{j=1}^{N} \delta Q_j \delta \dot{q}_j - \sum_{l=N}^{M-N} \delta Q_l \delta \dot{q}_l \tag{40}$$

$$= M\delta\ddot{x} \cdot \delta\dot{x} + (K + K_P)\delta x \cdot \delta\dot{x}$$

$$= -(C + K_D)\delta\dot{x} \cdot \delta\dot{x} - K_I \int_o^t \delta x \, d\tau \cdot \delta\dot{x}$$

which yields $$T_o \Delta \dot{S}_i = (C + K_D)\delta\dot{x} \cdot \delta\dot{x} \tag{41}$$

$$\Delta \dot{W} = -K_I \int_o^t \delta x \, d\tau \cdot \delta\dot{x}$$

$$[T_o \Delta \dot{S}_{rev}]_{ave} = [M\delta\ddot{x} \cdot \delta\dot{x} + (K + K_P)\delta x \cdot \delta\dot{x}]_{ave} = 0.$$

The first equation in (41), the derivative tracking control term along with the damping term are identified as dissipative terms. The second equation in (41), the integral tracking control term is identified as a generative term. As in the previous regulator case the same is true for the tracking case, in the final equation in (41), the proportional tracking control term is added to the system stiffness term and is identified as a reversible term.

Numerical simulations are performed for three separate PID tracking control cases with the numerical values listed in Table 4. The reference input signal is defined as $$x_r = A_{in} \sin \omega_{in} t.$$

Figure 29A:
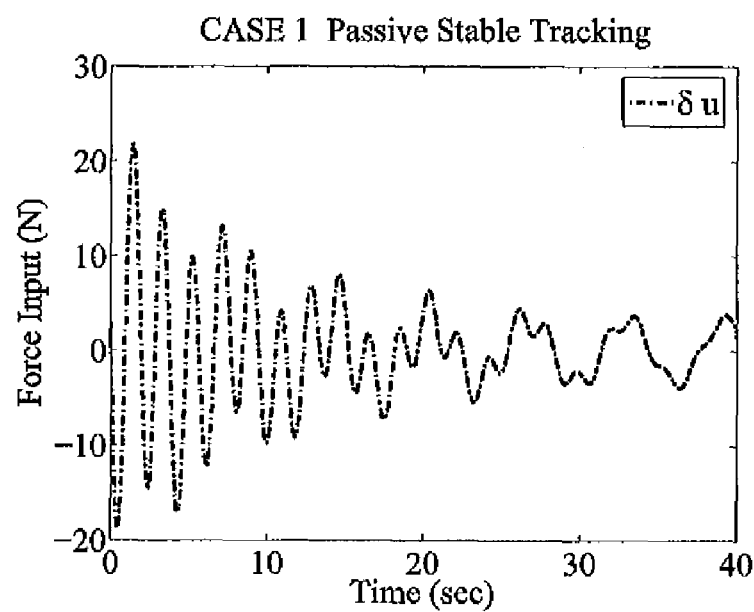
FIGS. 29(a) and (b) show for case 1 mass-spring-damper with PID tracking control numerical results.
Figure 29B:
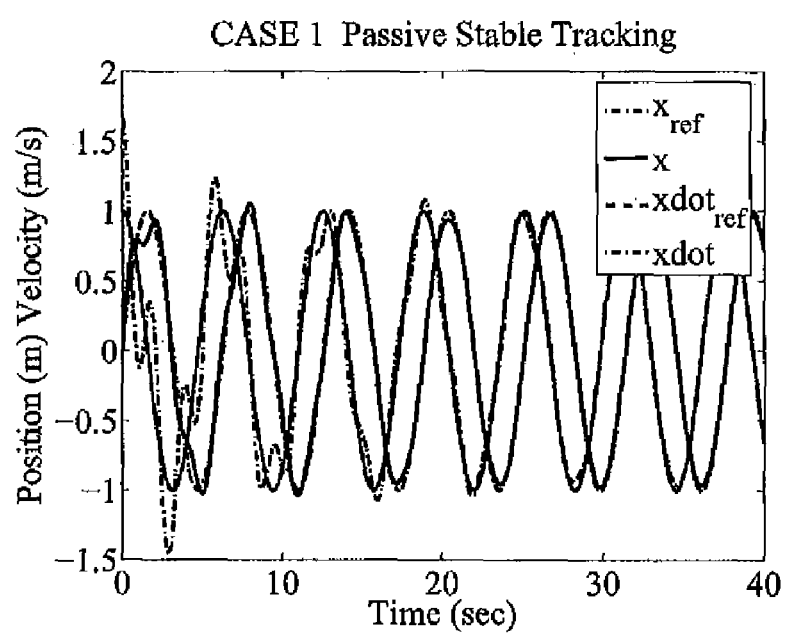
Figure 30A:
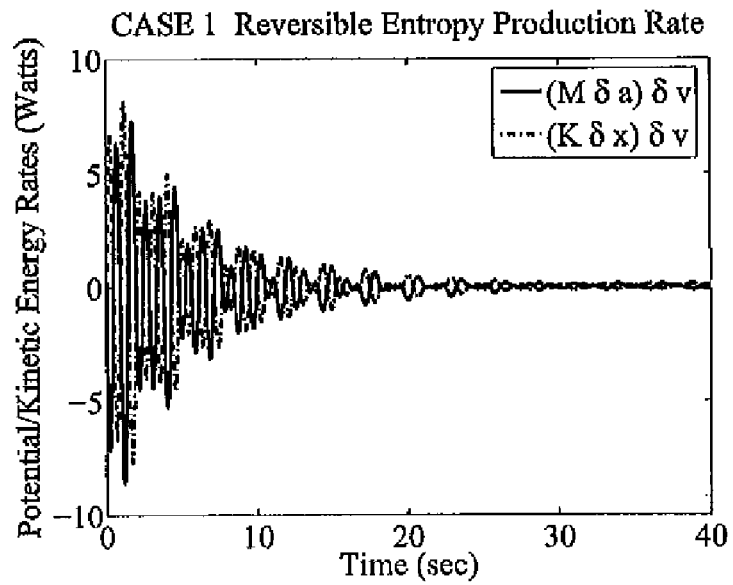
FIGS. 30(a) and (b) show for case 1a mass-spring-damper with PID tracking control numerical results.
Figure 30B:
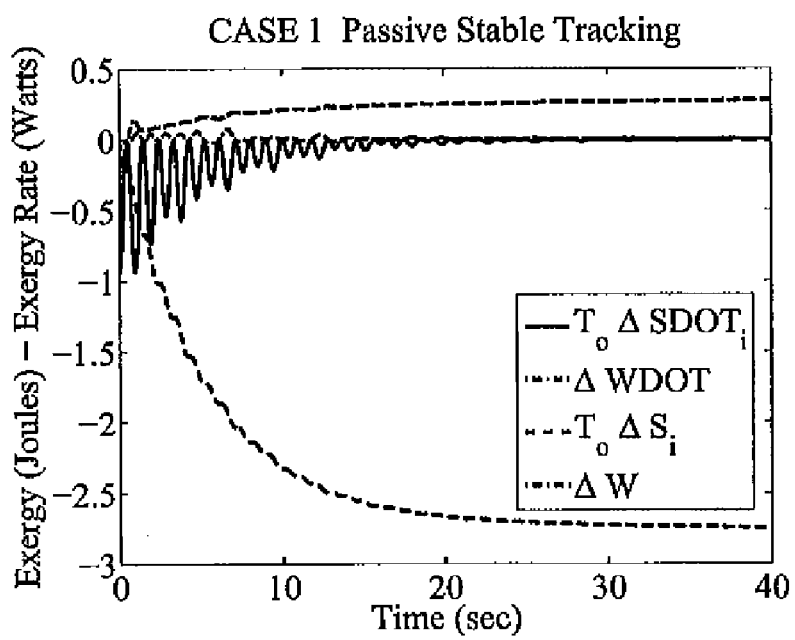
Figure 31A:
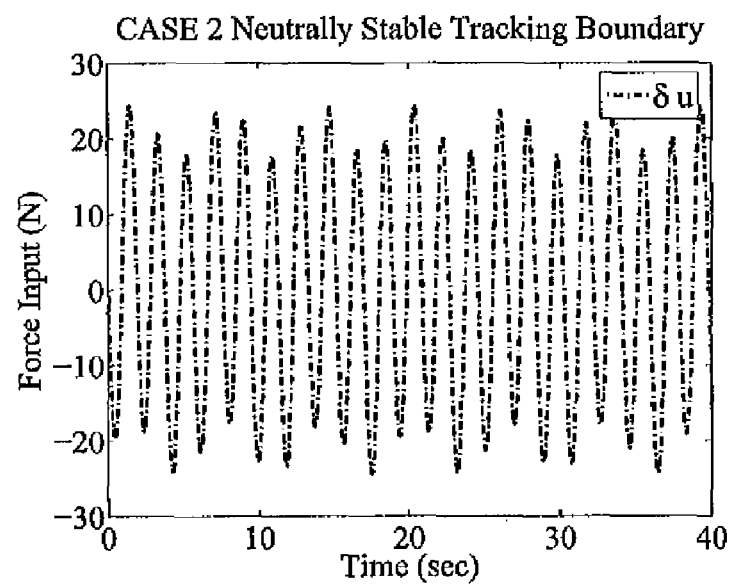
FIGS. 31(a) and (b) show for case 2 mass-spring-damper with PID tracking control numerical results.
Figure 31B:
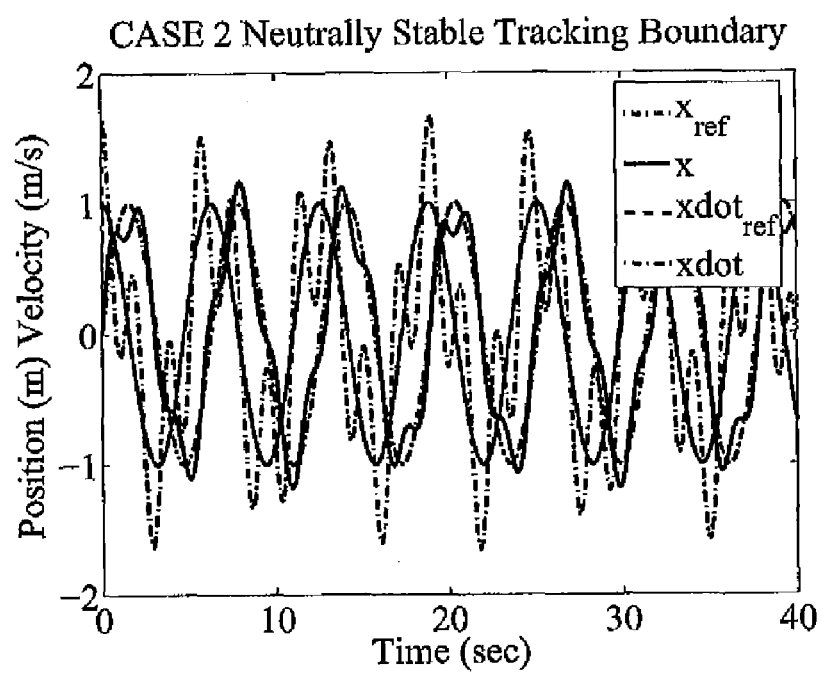
Figure 32A:
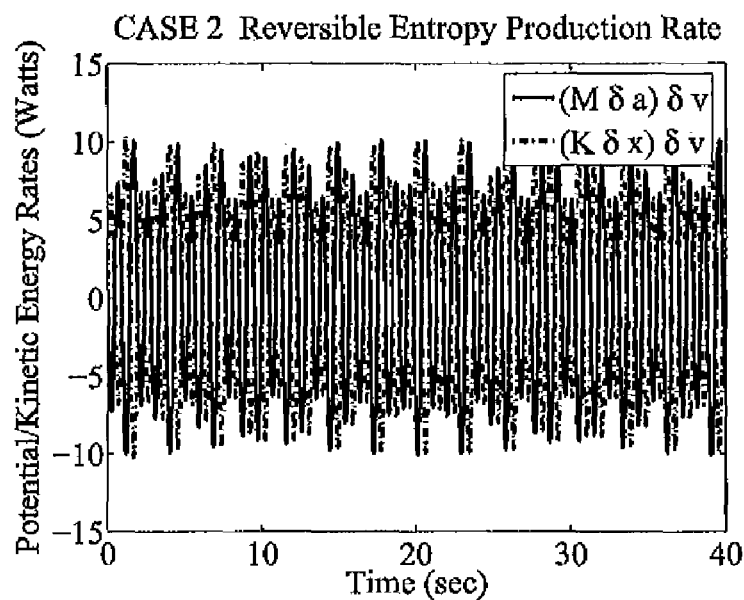
FIGS. 32(a) and (b) show for case 2a mass-spring-damper with PID tracking control numerical results.
Figure 32B:
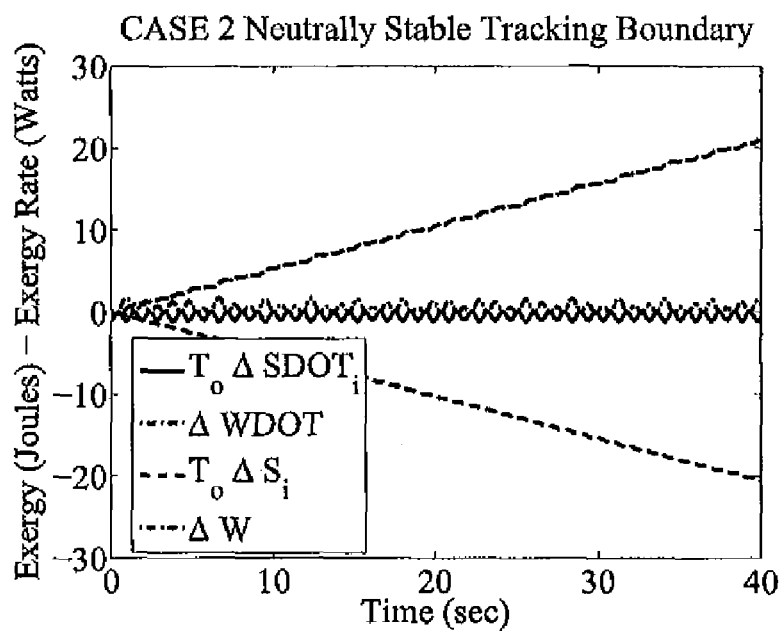
Figure 33A:
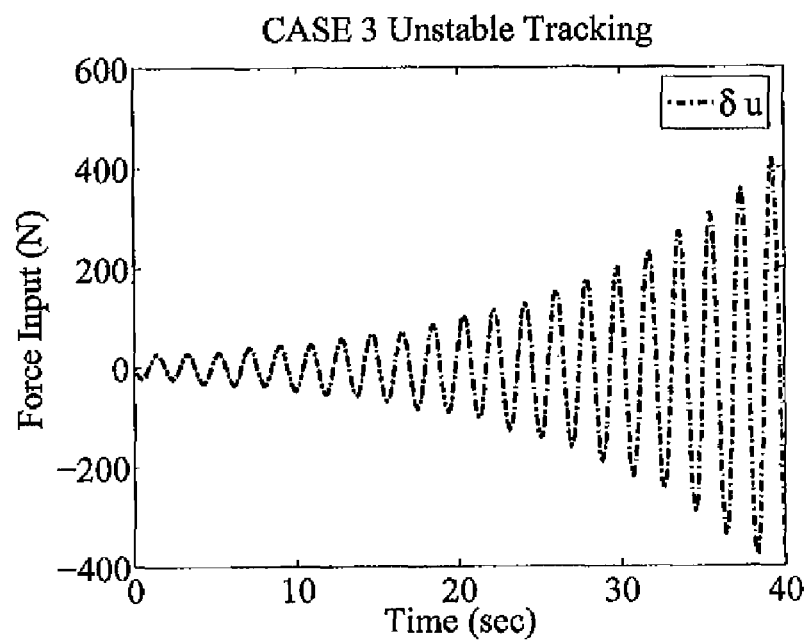
FIGS. 33(a) and (b) show for case 3 mass-spring-damper with PID tracking control numerical results.
Figure 33B:
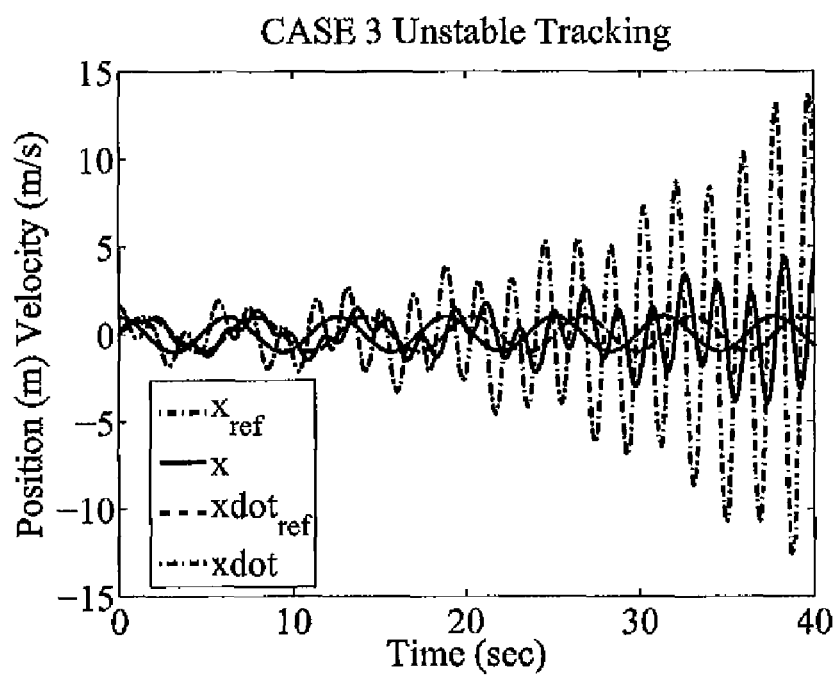
Figure 34A:
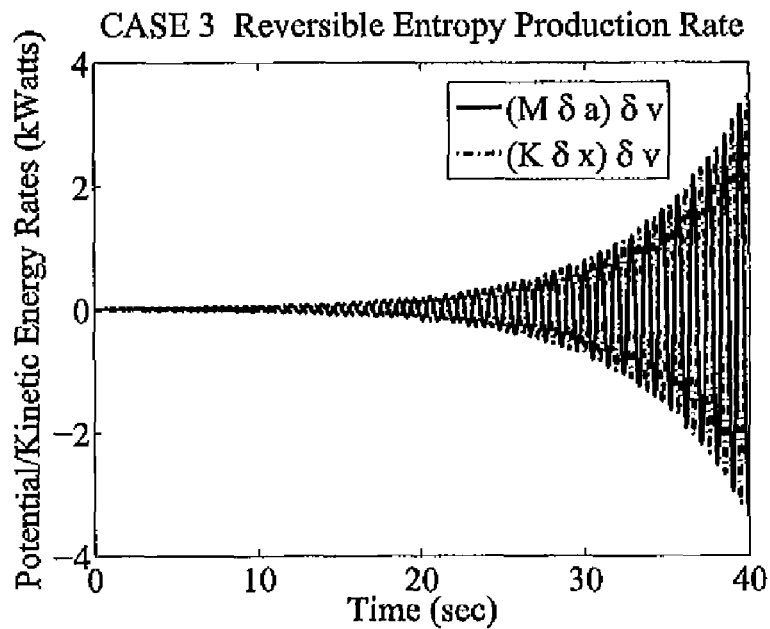
FIGS. 34(a) and (b) show for case 3a mass-spring-damper with PID tracking control numerical results.
Figure 34B:
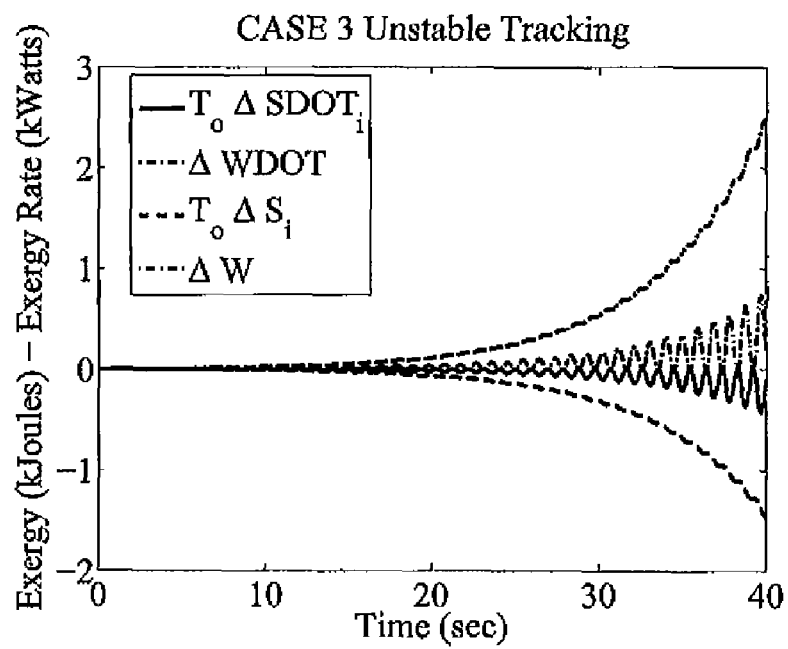

The mass-spring-damper system initial conditions are zero. For case 1 the tracking force input, $\delta u$, and tracking position and velocity errors are plotted in FIGS. 29(a) and (b). The variations for potential/kinetic energy rate, exergy, and exergy rate responses are shown in FIGS. 30(a) and (b). For case 1 passive stable tracking is observed from the decaying response and shows a predominately larger perturbation dissipative term with respect to the perturbation generative term. The initial transient tracking position and velocity errors eventually converge to the reference sinusoidal inputs. Case 1 corresponds with the tracking control equivalent to Corollary 4.1. For case 2, similar responses are given in FIGS. 31(a) and (b) for the tracking force input and tracking position and velocity errors. The variations for potential/kinetic energy rate, exergy, and exergy rate responses are shown in FIGS. 32(a) and (b). This case demonstrates the neutrally stable tracking boundary or where the dissipative terms are equivalent and cancel the generative terms which would correspond to the tracking control equivalent to Corollary 4.2. For case 3, similar responses are given in FIGS. 33(a) and (b) and 34(a) and (b). Case 3 shows responses that are growing exponentially, since the generative term is greater than the dissipative term. This final case would correspond to the tracking control equivalent to Corollary 4.3, respectively.

TABLE 4

Mass-spring-damper model and PID tracking control system gains

| Case No. | $K_P$ (kg/s$^2$) | $K_I$ (kg/s$^3$) | $K_D$ kg/s | M/M$_r$ (kg) | K/K$_r$ (kg/s$^2$) | C/C$_r$ (kg/s) | $A_{in}$ (m) | $w_{in}$ (rad/s) |
|---|---|---|---|---|---|---|---|---|
| 1 | 100.0 | 2.0 | 2.0 | 10.0/10.0 | 10.0/10.0 | 0.1/0.1 | 1.0 | 1.0 |
| 2 | 100.0 | 23.1 | 2.0 | 10.0/10.0 | 10.0/10.0 | 0.1/0.1 | 1.0 | 1.0 |
| 3 | 100.0 | 40.0 | 2.0 | 10.0/10.0 | 10.0/10.0 | 0.1/0.1 | 1.0 | 1.0 |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A control system design method comprising the steps of:
   representing a physical apparatus to be controlled as a Hamiltonian system, wherein the Hamiltonian system comprises a mass-spring-damper dynamic system;
   determining elements of the Hamiltonian system representation which are power generators, power dissipators, and power storage devices;
   analyzing stability and performance of the Hamiltonian system based on the results of the determining step and determining necessary and sufficient conditions for stability of the Hamiltonian system;
   creating a stable control system based on the results of the analyzing step; and
   employing the resulting control system to control the physical apparatus.

2. The method of claim 1 wherein the control system is nonlinear.

3. The method of claim 1 wherein in the analyzing step stability is determined in terms of power flow.

4. The method of claim 3 wherein in the analyzing step stability is determined in terms of whether the Hamiltonian system is moving toward or away from its minimum energy and maximum entropy state.

5. The method of claim 3 wherein in the analyzing step stability is determined via a Lyapunov derivative function.

6. The method of claim 5 where in the analyzing step stability is determined via a Lyapunov derivative function that is a decomposition and sum of exergy dissipation rate and exergy generation rate.

7. The method of claim 1 wherein the Hamiltonian system comprises a forced harmonic oscillator.

8. The method of claim 1 wherein the physical apparatus is selected from the group consisting of manufacturing devices, electronic devices, communications devices, transportation apparatuses, computer devices, computer networks, military apparatus, electrical power grids, Supervisory Control And Data Acquisition apparatus, and pipeline apparatus.

9. A control system for a physical apparatus, said control system comprising a stable control system based on results of analyzing stability and performance of the physical apparatus represented as a Hamiltonian system and based on the results of determining elements of the Hamiltonian system representation which are power generators, power dissipators, and power storage devices, and on the results of determining necessary and sufficient conditions for stability of the Hamiltonian system, wherein the Hamiltonian system comprises a mass-spring-damper dynamic system or a Duffing oscillator with Coulomb friction nonlinear damper system.

10. The control system of claim 9 wherein said control system is nonlinear.

11. The control system of claim 9 wherein stability is determined in terms of power flow.

12. The control system of claim 11 wherein stability is determined in terms of whether the Hamiltonian system is moving toward or away from its minimum energy and maximum entropy state.

13. The control system of claim 11 wherein stability is determined via a Lyapunov derivative function.

14. The control system of claim 13 where stability is determined via a Lyapunov derivative function that is a decomposition and sum of exergy dissipation rate and exergy generation rate.

15. The control system of claim 9 wherein the Hamiltonian system comprises a forced harmonic oscillator.

16. The control system of claim 9 wherein the physical apparatus is selected from the group consisting of manufacturing devices, electronic devices, communications devices, transportation apparatuses, computer devices, computer networks, military apparatus, electrical power grids, Supervisory Control And Data Acquisition apparatus, and pipeline apparatus.

17. A control system design method comprising the steps of:

representing a physical apparatus to be controlled as a Hamiltonian system, wherein the Hamiltonian system comprises a Duffing oscillator with Coulomb friction nonlinear damper system;

determining elements of the Hamiltonian system representation which are power generators, power dissipators, and power storage devices;

analyzing stability and performance of the Hamiltonian system based on the results of the determining step and determining necessary and sufficient conditions for stability of the Hamiltonian system;

creating a stable control system based on the results of the analyzing step; and employing the resulting control system to control the physical apparatus.

\* \* \* \* \*